US010414033B2

(12) United States Patent
Ekstrom et al.

(10) Patent No.: US 10,414,033 B2
(45) Date of Patent: Sep. 17, 2019

(54) POWER TOOL HALL EFFECT MODE SELECTOR SWITCH

(71) Applicant: Black & Decker Inc., Newark, DE (US)

(72) Inventors: Erik Ekstrom, Woodstock, MD (US); Stuart E. Garber, Towson, MD (US); Jongsoo Lim, Timonium, MD (US); David J. Smith, Columbia, MD (US); Shailesh P. Waikar, Parkville, MD (US)

(73) Assignee: Black & Decker Inc., Newark, NJ (US)

( * ) Notice: Subject to any disclaimer, the term of this patent is extended or adjusted under 35 U.S.C. 154(b) by 320 days.

(21) Appl. No.: 13/815,710

(22) Filed: Mar. 15, 2013

(65) Prior Publication Data
US 2014/0100687 A1 Apr. 10, 2014

Related U.S. Application Data

(60) Provisional application No. 61/709,558, filed on Oct. 4, 2012.

(51) Int. Cl.
B25C 1/00 (2006.01)
G01D 5/14 (2006.01)
(Continued)

(52) U.S. Cl.
CPC .............. B25C 1/00 (2013.01); B25C 1/06 (2013.01); G01D 5/147 (2013.01); B25F 5/00 (2013.01)

(58) Field of Classification Search
None
See application file for complete search history.

(56) References Cited

U.S. PATENT DOCUMENTS 618,085 A 1/1899 Grandy
2,519,617 A 8/1950 Wember
(Continued)

FOREIGN PATENT DOCUMENTS

EP 0387211 A2 9/1990
EP 0927605 A2 7/1999
(Continued)

OTHER PUBLICATIONS

Extended European Search Report, Application No. 13170116.1-1019/2669058, EPO (dated Mar. 20, 2018).
(Continued)

Primary Examiner — Sean Shechtman
(74) Attorney, Agent, or Firm — Wright IP & International Law; Eric G. Wright

(57) ABSTRACT

A mode selector switch for a power tool that can have a source of a magnetic field and use a magnetoresistive component to produce an output signal that changes when the strength of the magnetic field changes. The power tool can have a microprocessor that changes an operational mode of the power tool based on a change of the output signal from the magnetoresistive component. The magnetoresistive component can be a Hall effect sensor and the power tool can be a nailer. The power tool can have a switching means which changes an operational mode based upon a change in the strength of the magnetic field upon a magnetoresistive component. A method of controlling a power tool, having a step of changing an operational mode of a power tool based upon identifying a change in output from a magnetoresistor.

24 Claims, 23 Drawing Sheets

(51) Int. Cl.
  *B25C 1/06* (2006.01)
  *B25F 5/00* (2006.01)

(56) References Cited

U.S. PATENT DOCUMENTS

| | | | |
|---|---|---|---|
| 2,522,931 | A | 9/1950 | Curtiss |
| 2,569,221 | A | 9/1951 | Batten |
| 2,733,440 | A | 2/1956 | Jenny et al. |
| 3,708,095 | A | 1/1973 | Briggs, Jr. |
| 3,908,884 | A | 9/1975 | Schrepferman |
| 4,053,094 | A | 10/1977 | Males |
| 4,107,591 | A | 8/1978 | Herr et al. |
| 4,107,604 | A | 8/1978 | Bernier |
| 4,197,974 | A | 4/1980 | Morton et al. |
| 4,253,598 | A | 3/1981 | Haytayan |
| 4,463,888 | A | 8/1984 | Geist et al. |
| 4,597,517 | A | 7/1986 | Wagdy |
| 4,624,401 | A | 11/1986 | Gassner et al. |
| 4,688,710 | A | 8/1987 | Massari, Jr. et al. |
| 4,829,248 | A | 5/1989 | Loubier |
| 4,832,245 | A | 5/1989 | Terayama et al. |
| 4,858,812 | A | 8/1989 | Fealey |
| 4,897,914 | A | 2/1990 | Loubier |
| 4,966,041 | A | 10/1990 | Miyazaki |
| 5,197,647 | A | 3/1993 | Howell |
| 5,266,917 | A | 11/1993 | Bleeke et al. |
| 5,297,713 | A | 3/1994 | Perra et al. |
| 5,433,367 | A | 7/1995 | Liu |
| 5,493,216 | A | 2/1996 | Asa |
| 5,605,268 | A | 2/1997 | Hayashi |
| 5,813,588 | A | 9/1998 | Lin |
| 5,873,509 | A | 2/1999 | Liao |
| 6,012,622 | A | 1/2000 | Weinger et al. |
| 6,036,072 | A | 3/2000 | Lee |
| 6,053,389 | A | 4/2000 | Chu et al. |
| 6,131,787 | A | 10/2000 | Curtis |
| 6,199,739 | B1 | 3/2001 | Mukoyama et al. |
| 6,274,953 | B1 | 8/2001 | Hwang et al. |
| 6,290,115 | B1 | 9/2001 | Chen |
| 6,296,167 | B1 | 10/2001 | Jen |
| 6,425,306 | B1 | 7/2002 | Habermehl |
| 6,464,306 | B2 | 10/2002 | Shaw et al. |
| 6,499,642 | B1 | 12/2002 | Amada |
| 6,679,413 | B2 | 1/2004 | Miller et al. |
| 6,772,931 | B2 | 8/2004 | Miller et al. |
| 6,894,595 | B2 | 5/2005 | Howell |
| 7,137,541 | B2 | 11/2006 | Baskar et al. |
| 7,138,595 | B2 | 11/2006 | Berry et al. |
| 7,165,305 | B2 | 1/2007 | Kenney et al. |
| 7,213,732 | B2 | 5/2007 | Schell et al. |
| 7,213,733 | B1 | 5/2007 | Wen |
| 7,285,877 | B2 | 10/2007 | Gorti et al. |
| 7,314,155 | B2 | 1/2008 | Moeller et al. |
| 7,503,401 | B2 | 3/2009 | Gross et al. |
| 7,532,096 | B2 | 5/2009 | Zindler |
| 7,619,499 | B2 * | 11/2009 | Wieler ............... H01H 5/02 269/8 |
| 7,641,089 | B2 | 1/2010 | Schell et al. |
| 7,777,482 | B2 | 8/2010 | Munz et al. |
| 7,810,688 | B2 | 10/2010 | Wu et al. |
| 7,980,439 | B2 | 7/2011 | Akiba et al. |
| 2002/0117893 | A1 | 8/2002 | Shaw et al. |
| 2003/0030682 | A1 * | 2/2003 | Kim et al. .............. 347/7 |
| 2003/0042285 | A1 | 3/2003 | Wang |
| 2003/0230622 | A1 | 12/2003 | Rotharmel |
| 2004/0189284 | A1 * | 9/2004 | Haubold ............ F15B 15/10 324/207.2 |
| 2005/0050712 | A1 | 3/2005 | Lat et al. |
| 2005/0217874 | A1 | 10/2005 | Forster et al. |
| 2005/0217875 | A1 | 10/2005 | Forster et al. |
| 2005/0218176 | A1 | 10/2005 | Schell et al. |
| 2006/0016843 | A1 | 1/2006 | Ishizawa et al. |
| 2006/0091179 | A1 | 5/2006 | Moeller et al. |
| 2006/0169738 | A1 | 8/2006 | Ogawa et al. |
| 2006/0249554 | A1 | 11/2006 | Butzen et al. |
| 2007/0075112 | A1 | 4/2007 | Porth et al. |
| 2008/0099526 | A1 | 5/2008 | Kenney et al. |
| 2008/0251567 | A1 | 10/2008 | Shkolnikov et al. |
| 2008/0302846 | A1 | 12/2008 | Thompson |
| 2008/0308597 | A1 | 12/2008 | Wojcicki |
| 2009/0025701 | A1 | 1/2009 | Douglas et al. |
| 2009/0050667 | A1 | 2/2009 | Po |
| 2009/0183888 | A1 * | 7/2009 | Forster et al. .......... 173/20 |
| 2009/0200354 | A1 | 8/2009 | Arata et al. |
| 2009/0250500 | A1 | 10/2009 | Brendel et al. |
| 2009/0275273 | A1 * | 11/2009 | Purohit et al. ......... 451/357 |
| 2010/0206934 | A1 | 8/2010 | Vallon et al. |
| 2010/0289484 | A1 * | 11/2010 | Quinn ............ G01D 5/145 324/207.2 |
| 2011/0132959 | A1 | 6/2011 | Hlinka et al. |
| 2013/0186221 | A1 * | 7/2013 | Weiberle et al. ......... 74/103 |

FOREIGN PATENT DOCUMENTS

| | | |
|---|---|---|
| EP | 2002935 A2 | 12/2008 |
| WO | 2007126735 A2 | 11/2007 |

OTHER PUBLICATIONS

European Patent Office. Eurpoean Search Report for or EP 13170109.6 (dated Jun. 2, 2016).

Extended European Search Report, Application No. 17161682.4-1019/3213873, EPO (dated Jul. 13, 2018).

Extended European Search Report, Application No. 13170119.5-1701/2669059, EPO (dated Apr. 29, 2016).

Extended European Search Report, Application No. 13170097.3-1019/2716408, EPO (dated Mar. 15, 2018).

* cited by examiner

Table 1: Data Regarding Normalized Travel

| | y | 0 | | | | 0 | | 1 | |
|---|---|---|---|---|---|---|---|---|---|
| | Br | 1200 | | | | 1220 | | 1180 | |
| | z | 6.04 | | | | 5.54 | | 6.54 | |
| Normalized Travel (X/Z) | Travel (mm) | Flux Density @ Sensor (Nominal) | Output Voltage (V) | Upper Bump Range | Lower Bump Range | Flux Density @ Sensor (Max) | Max Output Voltage (V) | Flux Density @ Sensor (Max) | Min Output Voltage (V) |
| -0.58 | -3.5 | 13.09 | 2.01 | 2.8 | 1.95 | 15.15 | 2.17 | 10.9 | 1.85 |
| -0.50 | -3 | 15.06 | 2.06 | 2.8 | 1.95 | 17.73 | 2.24 | 12.36 | 1.89 |
| -0.41 | -2.5 | 16.98 | 2.12 | 2.8 | 1.95 | 20.27 | 2.31 | 13.76 | 1.93 |
| -0.33 | -2 | 18.74 | 2.17 | 2.8 | 1.95 | 22.62 | 2.37 | 15.04 | 1.96 |
| -0.25 | -1.5 | 20.24 | 2.21 | 2.8 | 1.95 | 24.64 | 2.43 | 16.11 | 1.99 |
| -0.17 | -1 | 21.39 | 2.24 | 2.8 | 1.95 | 26.19 | 2.47 | 16.93 | 2.02 |
| -0.08 | -0.5 | 22.1 | 2.26 | 2.8 | 1.95 | 27.16 | 2.50 | 17.45 | 2.03 |
| 0.00 | 0 | 22.35 | 2.26 | 2.8 | 1.95 | 27.49 | 2.50 | 17.62 | 2.04 |
| 0.08 | 0.5 | 22.1 | 2.26 | 2.8 | 1.95 | 27.16 | 2.50 | 17.45 | 2.03 |
| 0.17 | 1 | 21.39 | 2.24 | 2.8 | 1.95 | 26.19 | 2.47 | 16.93 | 2.02 |
| 0.25 | 1.5 | 20.24 | 2.21 | 2.8 | 1.95 | 24.64 | 2.43 | 16.11 | 1.99 |
| 0.33 | 2 | 18.74 | 2.17 | 2.8 | 1.95 | 22.62 | 2.37 | 15.04 | 1.96 |
| 0.41 | 2.49 | 16.98 | 2.12 | 2.8 | 1.95 | 20.27 | 2.31 | 13.76 | 1.93 |
| 0.42 | 2.51 | -16.98 | 1.18 | 2.8 | 1.95 | -20.27 | 0.99 | -13.76 | 1.37 |
| 0.50 | 3 | -18.74 | 1.13 | 2.8 | 1.95 | -22.62 | 0.93 | -15.04 | 1.34 |
| 0.58 | 3.5 | -20.24 | 1.09 | 2.8 | 1.95 | -24.64 | 0.87 | -16.11 | 1.31 |
| 0.66 | 4 | -21.39 | 1.06 | 2.8 | 1.95 | -26.19 | 0.83 | -16.93 | 1.28 |
| 0.75 | 4.5 | -22.1 | 1.04 | 2.8 | 1.95 | -27.16 | 0.80 | -17.45 | 1.27 |
| 0.83 | 5 | -22.35 | 1.04 | 2.8 | 1.95 | -27.49 | 0.80 | -17.62 | 1.26 |
| 0.91 | 5.5 | -22.1 | 1.04 | 2.8 | 1.95 | -27.16 | 0.80 | -17.45 | 1.27 |
| 0.99 | 6 | -21.39 | 1.06 | 2.8 | 1.95 | -26.19 | 0.83 | -16.93 | 1.28 |
| 1.08 | 6.5 | -20.24 | 1.09 | 2.8 | 1.95 | -24.64 | 0.87 | -16.11 | 1.31 |
| 1.16 | 7 | -18.74 | 1.13 | 2.8 | 1.95 | -22.62 | 0.93 | -15.04 | 1.34 |
| 1.24 | 7.5 | -16.98 | 1.18 | 2.8 | 1.95 | -20.27 | 0.99 | -13.76 | 1.37 |
| | | | 0.83 | | | | | | |

FIG. 12G

POWER TOOL HALL EFFECT MODE SELECTOR SWITCH

CROSS-REFERENCE TO RELATED APPLICATIONS

This patent application claims the benefit of the filing date of U.S. provisional patent application No. 61/709,558 entitled "Power Tool Hall Effect Mode Selector Switch" filed on Oct. 4, 2012.

INCORPORATION BY REFERENCE

This patent application incorporates by reference in its entirety U.S. provisional patent application No. 61/709,558 entitled "Power Tool Hall Effect Mode Selector Switch" filed on Oct. 4, 2012.

FIELD OF THE INVENTION

The present invention relates to a mode selector switch for a power tool.

BACKGROUND OF THE INVENTION

Power tools can have a mechanical switch by which an operator can change the functioning of a tool from a mode of operation ("mode") to a different mode of operation. Such mechanical switches are subject to physical breakage and can allow a tool to mechanically switch from one mode to another when not intended by the operator.

Unintended switching from one mode of operation to another can result from poor mechanical switch design, poor location of a mechanical switch on a tool, contact by the operator with a mechanical switch, external forces upon the mechanical switch, vibration, physical impact, as well as forces resulting from a tool being dropped or falling from a height. Additionally, mechanical switches can lack operator protection mechanisms. A switch can lack an effective means for the operator to readily identify in which mode of operation a tool is set at a given time. Additionally, switches can be unacceptably large, bulky, heavy, expensive, difficult to construct and inefficient to build.

A mechanical toggle switch can allow the operator to select a mode of operation on a power tool. The operation of a toggle switch requires the operator to directly exert force on the toggle which can result in overstress failures of the toggle switch. Mechanical toggles which can be used in a power tool are subject to breakage, unintentional switching, wear and unsatisfactory performance depending on the environment. Additionally, toggles are bulky and have tolerance stack-up dimensions which prevent desired reductions in the size of a power tool, such as a fastening device. In a power tool, a toggle switch would be typically mounted to an unserviceable electronic module. A failure of such a toggle switch requires a complete module replacement to achieve repair. Such a repair is inefficient and costly.

A switch requiring mechanical components and mechanical links between its components can have an unacceptably large switch assembly size, as well as poor mechanical tolerancing. Large size and/or poor mechanical tolerancing can result in construction difficulties and mechanical failure of a switch.

SUMMARY OF THE INVENTION

In an embodiment, the power tool disclosed herein can have a mode selector switch to switch the power tool from a first operational mode to a second operational mode; the mode selector switch can have at least a first magnetic field providing a source to the a Hall effect sensor that is configured to produce an output signal that changes when the strength of the first magnetic field changes; the power tool can have a microprocessor that changes an operational mode from the first operational mode to the second operational mode when the output signal changes. In an embodiment, the power tool can be a nailer.

The power tool can have an operational mode which is a sequential mode. The power tool can have an operational mode which is a nonsequential mode. The power tool can have an operational mode which is a bump mode.

In an embodiment, the power tool can have an operational mode which is a bump mode when the output of the Hall effect sensor is in a range of from about 5 mT at about 1.7V 5 mT to about 55 mT at about 2.8 V. In another embodiment, the power tool can have an operational mode which is a sequential mode when the output of the Hall effect sensor is in a range of about negative 60 mT at about 0.0 V to less than about 5 mT at less than about 1.7 V, and when the output of the Hall effect sensor is greater than about 55 mT at greater than about 2.7 V.

In an embodiment, the power tool can have a source of at least a first magnetic field that is a magnet. In an embodiment, a distance between a portion of the magnet and a portion of a Hall effect sensor can be a value in a range of about 0.1 to about 6.00 mm.

In an embodiment, the power tool can have an operational mode that is switched to sequential mode when a fault condition is detected regarding the Hall effect sensor output.

In an embodiment, the power tool can have a switching means for switching the power tool from a first operational mode to a second operational mode; the switching means can have a source of at least a first magnetic field; the power tool can have a sensing means for sensing the strength of the first magnetic field; the sensing means can be adapted to produce an output signal which can change when the strength of the first magnetic field changes, and the power tool can have a data processing means that can process the output signal and can change the first operational mode to the second operational mode when the output signal changes.

In an embodiment, the power tool can have a switching means which comprises a means for changing the relative distance between the source of at least a first magnetic field and the sensing means.

In an embodiment, the power tool can have a means for changing the relative distance between the source of at least a first magnetic field and the sensing means which is a member which can be moved and which has a magnet. In an embodiment, the sensing means can be a magnetoresistor. In an embodiment, the sensing means can be a Hall effect sensor.

In an embodiment, the data processing means can be a microprocessor.

The power tool can use a method of controlling a power tool, having the method steps of: providing a power tool having a switch having a magnetic member having at least a first magnetic field and a sensing member having a magnetoresistor detecting the first magnetic field and producing a first output of the magnetoresistor to a microprocessor; exposing the magnetoresistor to a first magnetic flux of the first magnetic field; changing the state of the magnetic member achieving an exposing the magnetoresistor to a second magnetic flux different from the first magnetic flux; the step of exposing the magnetoresistor to a second magnetic flux producing a second output of the magnetoresistor to the microprocessor. The method can have method steps of computationally identifying the change from the first output of the magnetoresistor to the second output of the magnetoresistor by the microprocessor; and processing machine readable instructions by the microprocessor to change an operational mode of the power tool from a first operational mode to a second operational mode based upon identifying the change from the first output of the magnetoresistor to the second output of the magnetoresistor.

In an embodiment, the method of controlling a power tool can have the step of changing to a second operational mode which is a bump mode. In an embodiment, the method of controlling a power tool can have the step of changing to a second operational mode which is a sequential mode. In an embodiment, the method of controlling a power tool can have the step of providing the sensing member having a magnetoresistor which is a Hall effect sensor.

BRIEF DESCRIPTION OF THE DRAWINGS

The present invention will become more fully understood from the detailed description and the accompanying drawings, wherein:

FIG. 12G is a data set in support of the graphs of FIGS. 12B-12F and Examples 4 and 5.

DETAILED DESCRIPTION OF THE INVENTION

Figure 1:
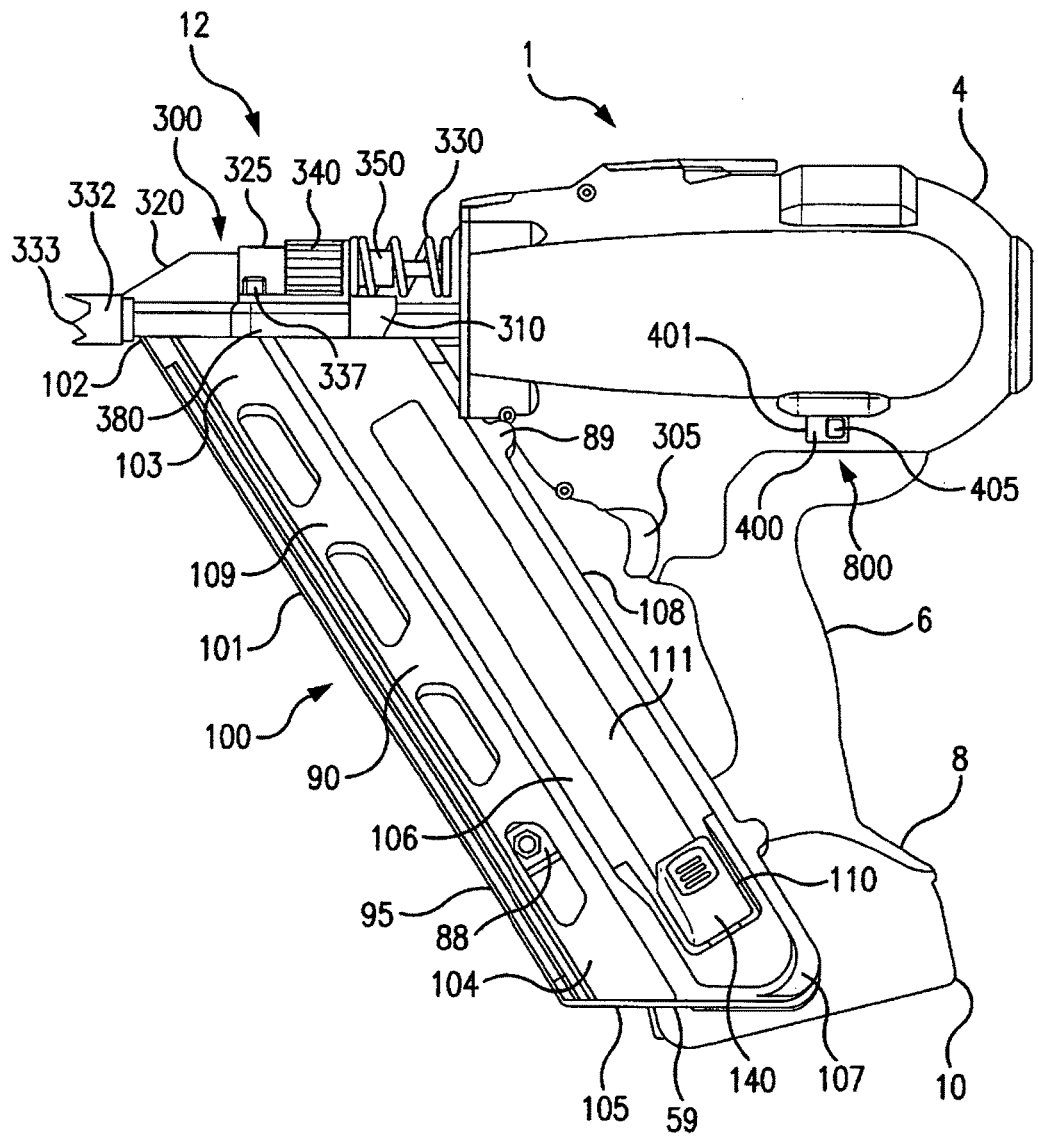
FIG. 1 is a mode selector switch-side view of an exemplary nailer having a mode selector switch.

A Hall effect mode selector switch (or "switch") is a compact, lightweight, durable and reliable mode selector switch for a power tool. Herein, unless otherwise specified, the terms "mode selector switch" is to be broadly construed to encompass switches and switch mechanisms using magnetoresistive components, magnetometers, sensors and magnetic detection components. Such components include but are not limited to Hall effect sensors. A broad variety of such components can be equivalents to a Hall effect sensor in the embodiments herein, can be used and are intended to be encompassed by this disclosure. Switches using such components can be easily constructed, are non-contact and are resistant to accidental mode switching and breakage.

Additionally, switches using a magnetoresistive component (e.g. Hall effect sensor) can be reliable in operation, and in embodiments can use, or be used with, a variety of operator protection features. In one embodiment, a Hall effect mode selector switch uses a Hall effect sensor and can be located such that it does not contact a flat surface upon which a power tool is set to avoid accidental mode switching and breakage of the switch. In an embodiment, an index bolt can be used to make the Hall effect mode selector switch resistant to breakage and accidental switching. The Hall effect mode selector switch is also resistant to switching from one mode to another as a result of a drop or a fall from a height.

Use of a Hall effect mode selector switch as disclosed herein provides ease of manufacture and assembly, as well as reducing scrap. Additionally, the switch embodiments disclosed herein are resistant to breaking during manufacturing and assembly. Further, the designs disclosed herein minimize tolerances between the operator Interface (e.g. slider knob) and sensor which achieves very consistent performance from tool to tool.

A non-contact Hall Effect sensor achieves a long-life mode selector switch. Because it is a non-contact switch, it is wear resistant, vibration resistant and impact resistant.

Herein, the term "mode" means an operational setting, conditional of operation, mode of operation, or state of a tool. The term "mode" is used synonymously and interchangeably with the terms "mode of operation" and "operational mode" of a tool. The term "mode" is to be broadly construed and for non-limiting example encompasses one or more changes in the operational characteristics of a tool, e.g.

a functioning state, a setting, an operational characteristic, or an aspect of operation of a power tool.

The switch embodiments disclosed herein have broad applications, can be used in numerous types of power tools and are not intended to be limited to any type of power tool. Examples of tools having a mode selector switch using a magnetometer, such as a Hall effect sensor, include, but are not limited to a: fastening tool; nailer; driver; riveter; stapler; drywall screw gun (e.g. lock on mechanism); saw (e.g. lock off mechanism); drill (e.g. transmission setting, gear selection, speed selection, direction of rotation setting); grinder; hedge trimmer; pole pruner; sander; router and a flash light (e.g. a setting, on/off, brightness, number of bulbs, lighting patterns). The disclosure herein can be used with a broad variety of mode switches, non-contact switches and clutches (to achieve a clutch setting).

In an embodiment, a power tool, such as a nailer can have a Hall effect mode selector switch (e.g. FIG. 1).

A switch acting as a decision point (A or B decision point, or a greater number of choices e.g. A or B, or 1 or 2 . . . n choices of settings, states, positions, selections or modes) can employ the switch technology disclosed herein using a magnetometer (e.g. a Hall effect sensor). A position switch with from one (1) to twelve (12), or more positions, can be effectively achieved with the technology disclosed herein. A Hall effect mode selector switch is an example of a non-contact switch which can be used instead of a mechanically linked switch, or mechanical switch, on a power tool. A mode selector switch using a Hall effect sensor can be used for an on/off switch of a power tool. A Hall effect mode selector switch can also be used to control one or more motor speed settings for a power tool and/or to control one or more clutch settings for a power tool and/or more directional settings for a power tool.

In an embodiment, a mode selector switch can have a magnetometer (e.g., a Hall effect sensor), at least one magnetic source, a sliding member which allows the relative positions between the magnetic source and magnetometer (e.g. Hall effect sensor) to change. Additionally, a mode selector switch can have circuitry which carries the output of the magnetometer (e.g., a Hall effect sensor) to a microprocessor which can execute machine readable code in response to such output and which is capable of executing computer logic regarding mode status and/or mode switching of a power tool. An example circuit diagram of a mode selection circuit including a Hall effect sensor can be viewed in FIG. 11.

This disclosure is not limited as to the location or configuration of the microprocessor, circuitry or computer. For example, the microprocessor and hall effect sensor can be on different circuits or different circuit boards. Likewise, the execution of computer logic regarding mode status and/or mode switching of a tool can be executed by an appropriate means and is not limited to a single microprocessor. The logic and related code can be distributed, as can the elements of the circuit and processing system.

In an embodiment, a Hall effect sensor can be mounted to a circuit board of an electronics module of a power tool. The circuit board can also contain a microprocessor 1040 (FIG. 11) which receives an unmodified or modified signal input from the Hall effect sensor. A sliding member or slider can be used which can have one or more magnets insert molded into the sliding member or slider such that one or more magnets can affect the Hall effect sensor and affect the output of the Hall effect sensor.

The mode selector switch in its several embodiments and many aspects can be used for use with fastening tools other than nailers and can be used with fasteners other than nails. Additional areas of applicability of the present invention will become apparent from the detailed description provided herein. The detailed description and specific examples herein are not intended to limit the scope of the invention. The claims of this application are to be broadly construed.

FIG. 1 is a mode selector switch-side 90 view of an exemplary nailer 1 having a mode selector switch. In the embodiments illustrated herein, the switch-side references the side of the nailer 1 on which a slider knob 405 of slider 400 is visible and protrudes through a switch window 401. However, in other embodiments the switch can be located on the nail-side which is the side illustrated in FIG. 2, or elsewhere on the nailer 1. The naming conventions used herein are not intended to be limiting and locations of the switch in embodiments of a power tool can broadly vary. FIG. 1 illustrates a switch which is constructed according to the principles of the present invention and which has the slider knob 405.

With reference to FIG. 1, a magazine 100 is shown in operative association with the nailer 1. In the example embodiment of FIG. 1, the nailer 1 is a cordless nailer. However, a nailer using the switch disclosed herein can be of a different type and/or use a different power source.

The nailer 1 can be operated in at least two modes: a "sequential" mode which is also known as a "single fire" mode; and a "bump" mode which is also known as a "rapid fire" mode. In the sequential mode, the operator can press the nailer 1 against an object which depresses a contact trip. A broad variety of contact trips can be used. In the embodiments illustrated herein, a lower contact trip 320 and an upper contact trip 310 are shown. Depressing one or both of the lower contact trip 320 and the upper contact trip 310 can be required to achieve nail driving depending on the embodiment being considered. Then, the operator can activate a trigger 305 and the nailer 1 will drive the nail. In the sequential mode, the operator must activate the trigger 305 mechanism each time a nail is intended to be driven.

The nailer 1 can also be operated in "bump" mode. In the bump mode, the operator can hold the trigger 305 then press the nailer 1 against a workpiece which depresses a contact trip causing the nailer 1 to drive a nail.

When in bump mode, the operator can drive a nail by closing two firing switches, e.g. trigger 305 and lower contact trip 320, in any order. In bump mode, the operator can work at a rapid pace by holding the trigger 305 down and "bumping" the lower contact trip 320 along the work piece.

In sequential mode, the operator must first depress the lower contact trip 320 against the work piece and then pull the trigger 305 to drive a nail. Closing two firing switches in that sequence will cause the tool drive a nail. Additional firing switches can require closure, e.g. 3, 4, or more firing switches. The lower contact trip 320 and/or upper contact trip 310 can be required to be depressed or tripped in conjuction with trigger 305 to achieve firing or driving.

The lower contact trip and upper contact trip can move in coordination with each other. Alternatively, the lower contact trip 320 can move independently of the upper contact trip 310. A contact trip spring 330 can be used to return the upper contact trip 310 to a home position.

There can be additional modes of operation in addition to, or instead of, sequential mode and/or bump mode, e.g. in a non-limiting example an operator protection mode, a standby mode, a power down mode, a diagnostic mode, misfire, jam detection, fault, fault to shutdown, back-up, torque monitoring or other mode. Mode detection can use data regarding motor rotation and changes in motor rotation.

Mode detection can also use data regarding torque resulting from the motor and changes in torque.

In bump mode, the operator can keep the trigger 305 depressed and repeatedly bump or press the nailer 1 against the workpiece to drive a series of nails into the workpiece. Nailers can be designed to allow the operator to choose between two or more modes of firing. In an embodiment, the operator can choose from two modes of operation, e.g. a bump mode and a sequential mode.

The mode of operation of a fastening tool can be set by the operator by a mode selector switch. In a non-limiting example, a non-contact switch can have a magnetoresistive component (also as "magnetoresistive switch" or "magnetometer"). A Hall effect sensor is a non-limiting example of a magnetometer. The mode selector switch can have a Hall effect sensor. In an embodiment, a digital Hall effect sensor or an analog Hall effect sensor can be used in a Hall effect sensor mode selector switch, e.g. mode selector switch 800, shown in FIG. 1.

A digital Hall effect sensor can operate from 0 V to a high voltage. A linear Hall effect sensor can provide an analog output and can be used with voltages across a wide range of values, e.g. 0V to 5 V.

Numeric values and ranges herein, unless otherwise stated, also are intended to have associated with them a tolerance and to account for variances of design and manufacturing. Thus, a number can include values "about" that number. For example, a value X is also intended to be understood as "about X". Likewise, a range of Y-Z, is also intended to be understood as within a range of from "about Y-about Z". Unless otherwise stated, significant digits disclosed for a number are not intended to make the number an exact limiting value. Variance and tolerance is inherent in mechanical design and the numbers disclosed herein are intended to be construed to allow for such factors (in a non-limiting e.g., ±10 percent of a given value). Likewise, the claims are to be broadly construed in their recitations of numbers and ranges.

As disclosed herein a reference to a nominal value means the value without inclusion of its tolerances and/or variances.

FIG. 1 illustrates an example embodiment of an inventive nailer. The nailer 1 has a housing 4 and a motor (which can be covered by the housing 4) that drives a nail driving mechanism for driving nails which are fed from the magazine 100. A handle 6 extends from housing 4 to a base portion 8 and can terminate in a battery pack 10. The battery pack 10 can be configured to engage a base portion 8 of handle 6 and provides power to the motor such that the nailer 1 can drive one or more nails which are fed from the magazine 100.

The motor in the nailer 1 drives a nail driving mechanism for driving a plurality of nails 55 (e.g. FIGS. 3-4) that are fed from a magazine 100.

To achieve a retracted state for unloading, loading or reloading, a pusher assembly 110 has a pusher assembly knob 140 that can be moved by the operator toward the base end 105 of the magazine 100 where it is reversibly fixed in place. The pusher assembly knob 140 is connected to a pusher 112 (e.g. FIG. 3-4). The movement of the pusher assembly knob 140 toward the base end 105 of the magazine where the pusher assembly knob 140 can be reversibly fixed, moves the pusher 112 into a pusher recess 171 (e.g. FIGS. 3-4). The movement of the pusher 112 into the pusher recess 171 results in a retracted stated of the pusher assembly 110. The retracted state of the pusher assembly 110 can be maintained by reversibly fixing the pusher assembly knob 140 in place. The pusher assembly knob 140 can be reversibly fixed in place or secured against movement out of a retracted state by a variety of means, e.g. a raised detent, a spring loaded detent, and a raised U-shaped detent.

A broad variety of fasteners can be used with the magazine 100. In an embodiment, the magazine 100 can hold a plurality of nails 55 (e.g. FIGS. 3-4) therein. In an embodiment, collated nails can be inserted into the magazine 100 for fastening.

The nailer 1 can have a nosepiece assembly 12. In the embodiment illustrated in FIG. 1, the nosepiece assembly 12 is fixed nosepiece assembly 300 and has an upper contact trip 310 and a lower contact trip 320 that is guided and/or supported by a lower contact trip support 325.

Fixed nosepiece assembly 300 is adjustable allowing the operator to adjust the driving characteristics of the fixed nosepiece assembly 300. In the embodiment of FIG. 1, a depth adjustment wheel 340 can be moved to effect the position of a depth adjustment rod 350. In an embodiment, the fixed nosepiece assembly 300 can use one or more of a magazine screw 337 to fix the nosepiece assembly 300 to the magazine 100. In an embodiment, the fixed nosepiece assembly 300 can fit with the magazine 100 by a magazine interface 380.

Figure 11:
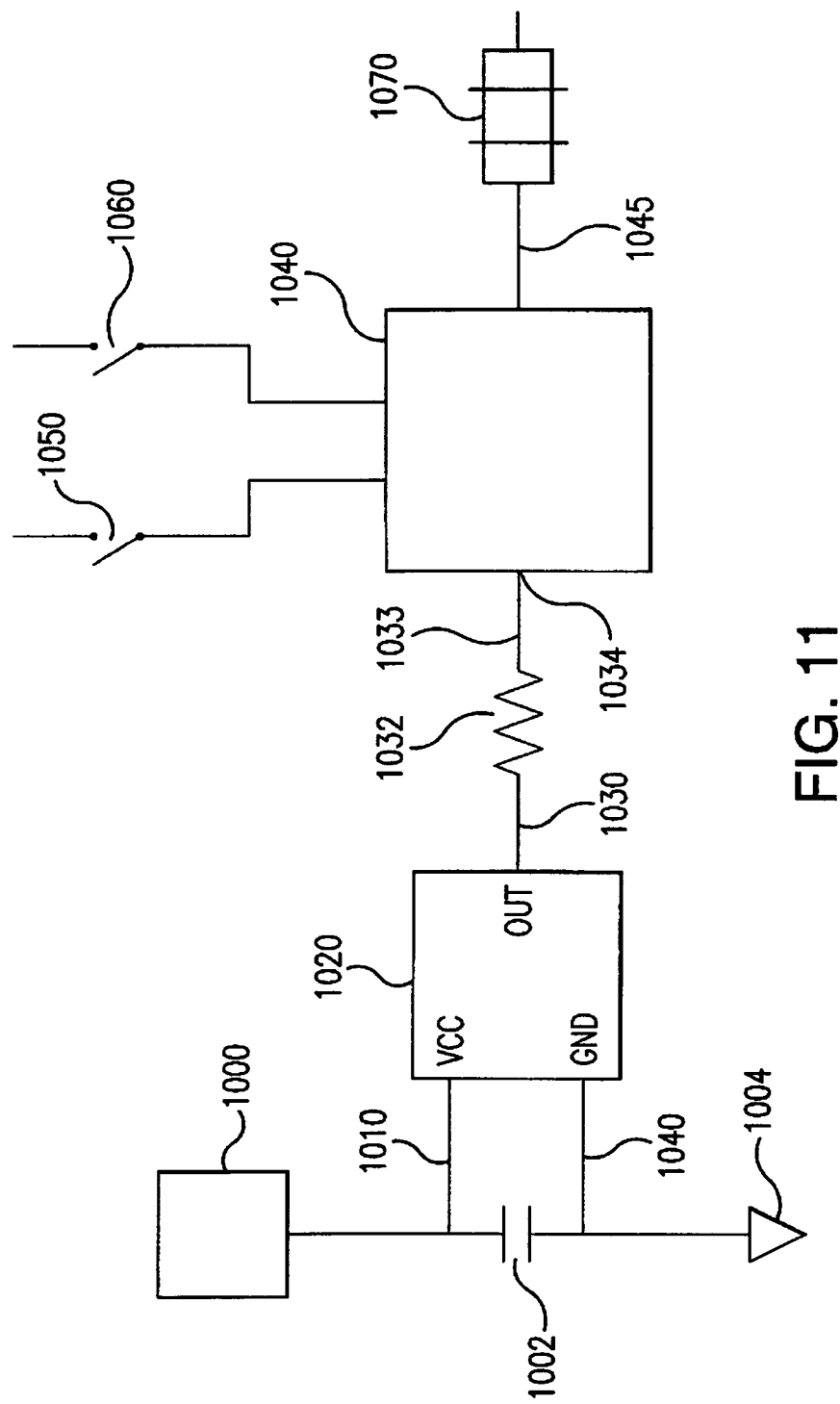
FIG. 11 is an embodiment of a circuit diagram of a mode selection circuit including a Hall effect sensor.

With reference to FIG. 1, the slider 400 of the mode selector switch 800 is constructed according to the principles of the present invention and is shown in operative association with the nailer 1. The mode selector switch 800 can have a slider 400, a Hall effect sensor 600 and a microprocessor 1040 as shown in FIG. 11.

The nosepiece assembly 12 can be coupled to housing 4. In a non-limiting example, the nosepiece assembly 12 can be a fixed nosepiece assembly 300 (e.g. FIG. 1), or a latched nosepiece assembly.

The magazine 100 can optionally be coupled to the housing 4 by a coupling member 89. The magazine 100 has a nose portion 103 that can be proximate to the fixed nosepiece assembly 300 and engages the fixed nosepiece assembly 300 at the nose portion 103 of the magazine 100 which has a nose end 102. The magazine 100 can be coupled to a base portion 8 of the handle 6 at a base portion 104 of the magazine 100 by a base coupling member 88. The base portion 104 of the magazine 100 is proximate to the base end 105 of the magazine 100.

The magazine 100 can have a magazine body 106 with an upper magazine 107 and a lower magazine 109. An upper magazine edge 108 is proximate to and can be attached to housing 4. The lower magazine 109 has a lower magazine edge 101.

The magazine 100 includes a nail track 111 sized to accept a plurality of nails 55 therein. The nails can be guided at least in part by a feature of the upper magazine 107 which can guide at least one end or portion of a nail or fastener. In another embodiment, lower magazine 109 can guide at least a portion of a nail or fastener.

In an embodiment, the plurality of nails 55 can have nail tips which are supported by a lower liner 95. The plurality of nails 55 are loaded into the magazine 100 by inserting them into the nail track 111 through a nail feed slot 59 which can be located at or proximate to the base end 105. The plurality of nails 55 can be moved through the magazine 100 towards the nosepiece assembly 12 and/or the fixed nosepiece assembly 300 by a force imparted by contact from the pusher assembly 110.

The fixed nosepiece assembly 300 also can have a nose 332 which has a nose tip 333 that can facilitate temporary and reversible placement on a workpiece by having at least one of e.g.: a pointed portion, a serration, a tooth, a high friction or adhesive portion, or other feature that can facilitate a temporary and reversible placement of the nose 332 on a workpiece. When the nose 332 is pressed against a workpiece, the lower contact trip 320 and the upper contact trip 310 can be moved toward the housing 4 and a contact trip spring 330 can be compressed.

In an embodiment, the upper contact trip 310 is connected to an activation rod which is a linkage that can strike a contact trip actuator. The contact trip actuator can then activate a tactile switch sending a signal to a microprocessor 1040 that runs a machine executable code that turns a motor and drives a nail with a driver blade 54.

The fixed nosepiece assembly 300 is adjustable, having a depth adjust, allowing the operator to adjust the driving characteristics of the fixed nosepiece assembly 300. In the embodiment of FIG. 1, the depth adjustment wheel 340 can be moved to affect the position of a depth adjustment rod 350. In an embodiment, the depth adjustment wheel 340 is a thumbwheel. In an embodiment, the position of the depth adjustment rod 350 can also affect the distance between the nose tip 333 a nosepiece insert tip, or the tip of a nail to be driven, or a nosepiece channel or channel exit through which a nail can pass when it is driven into a workpiece. In an embodiment, depth adjustment can be achieved by changing the relative distance between the upper contact trip 310 and the lower contact trip 320.

Additionally, the depth adjustment wheel 340 (or other means of depth adjustment) allows the operator to determine how far a nail shank can be driven into a workpiece and how much of the nail shank under its nail head can be located at a distance from a workpiece surface.

In an embodiment, using the depth adjustment wheel 340 allows for the movement of the lower contact trip 320 independent of the location of the upper contact trip 310.

In an embodiment, the magazine screw 337 can be screwed to couple the fixed nosepiece assembly 300 to the magazine 100, or unscrewed to decouple the magazine 100 from the fixed nosepiece assembly 300.

Means for releasing the fixed nosepiece 300 from the magazine 100, can be as non-limiting examples, a wrench, a screwdriver, an Allen wrench 199 (FIG. 2), or another device capable of loosening a fastener. Types of fasteners for fixing nosepiece 300 to the magazine 100 can be as non-limiting examples: a screw, a nail, a nut, a bolt or a reversible fastener.

As disclosed above, the fixed nosepiece assembly 300 can fit with the magazine 100 by the magazine interface 380. In an embodiment, the nosepiece assembly 12 can have a sensor which indicates when the fixed nosepiece assembly 300 is not properly or completely screwed into or connected to the magazine 100. In yet another embodiment, the sensor for indicating when the fixed nosepiece assembly 300 is not properly or completely screwed into or connected to the magazine 100 is installed in the magazine 100 or the housing 4. The sensor can also have a number of pieces with at least one placed in the nosepiece assembly 12 and optionally another placed elsewhere, such as in the magazine 100 and/or the housing 4.

In another embodiment, the magazine 100 can have a sensor which indicates the number of nails remaining to be driven and/or a sensor which indicates the number of nails in the magazine 100. In another embodiment, the magazine 100 can have a sensor which indicates when the magazine has less than a set number of nails, or that the magazine is empty.

In yet another embodiment, the magazine 100 can have a nail length sensor which indicates a length of one or more of a plurality of nails 55 loaded into the magazine 100 and which can provide an input to a microprocessor of nailer 1. The microprocessor 1040 can execute machine readable code which can adjust the driving energy expended to drive a nail of an indicated length. Such an energy control system can extend battery life by controlling the energy expended in driving nails of an indicated length. This control of driving can be a fastener tool energy control method and a system for energy control of a power tool (e.g. nailer energy control system).

The pusher assembly 110 can be in a retracted state (e.g. FIG. 3) allowing for the loading of the plurality of nails 55, or in an engaged state (e.g. FIG. 4) in which the pusher assembly 110 pushes the plurality of nails 55 as feed to the nosepiece assembly 12 for driving. The nails can be fed toward the nose end 102 along the nail track 111 into the nosepiece assembly 12 by the pusher assembly 110 which has the pusher assembly knob 140. The pusher 112 of the pusher assembly 110 can be guided in its movement within the magazine 100 and a spring (e.g. a spring 200; see e.g. FIG. 3, FIG. 4) can apply force to the pusher assembly 110 to feed one or more of the plurality of nails 55 to the nosepiece assembly 12 for fastening.

A retracted state of the pusher assembly 110 can be achieved for unloading, loading or reloading of magazine 100. The pusher assembly knob 140 of the pusher assembly 110 can be moved by the operator toward the base end 105 of the magazine where it can be reversibly fixed in place, or so as to have a limited range of motion but not fixed in place. The pusher assembly knob 140 is connected to the pusher 112. The movement of the pusher assembly knob 140 toward the base end 105 of the magazine moves the pusher 112 into the pusher recess 171. The movement of the pusher 112 into the pusher recess 171 results in a retracted stated of pusher assembly 110. Optionally, instead of fixing the pusher assembly knob 140 in place, a detent or mechanical means can be provided which prevents the pusher assembly knob 140 and/or the pusher 112 from movement out of the retracted state until the operator activates engagement of the pusher assembly 110 to push the plurality of nails 55 toward the nose end 102.

In an embodiment, the pusher assembly 110 can be placed in an engaged state by the movement of the pusher 112 into the nail track 111 and in the direction of loading of fasteners (e.g. nails) to push the plurality of nails 55 toward the nose end 102. The pusher assembly knob 140 can be reversibly fixed in place or secured against movement out of a retracted state by a variety of means. In an embodiment, the operator can accomplish reloading by using one hand to pull back the pusher assembly 110, reversibly retracting it, reloading the magazine 100 with fasteners, and then engaging the pusher assembly 110 for fastening operation.

In another embodiment, the magazine can use a push button mechanism, or other detent or latching mechanism, instead of the pusher assembly knob 140 in the pusher assembly 110.

Figure 2:
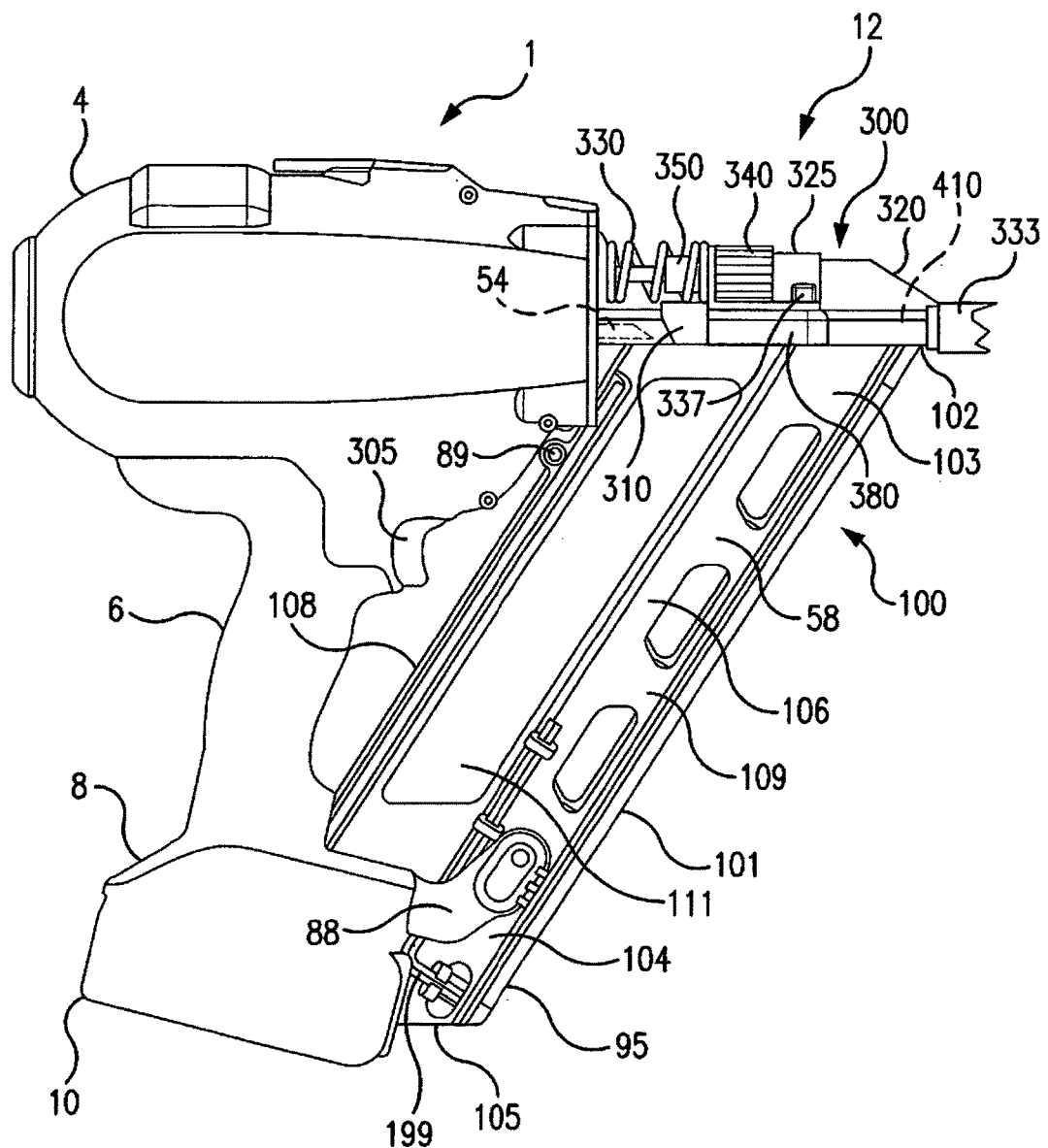
FIG. 2 is a nail-side view of an exemplary nailer.

FIG. 2 is a side view of exemplary nailer 1 having a magazine 100 and viewed from a nail-side 58. The Allen wrench 199 is illustrated as reversibly secured to the magazine 100. Like reference numbers in FIG. 1 identify like elements in FIG. 2.

Figure 3:
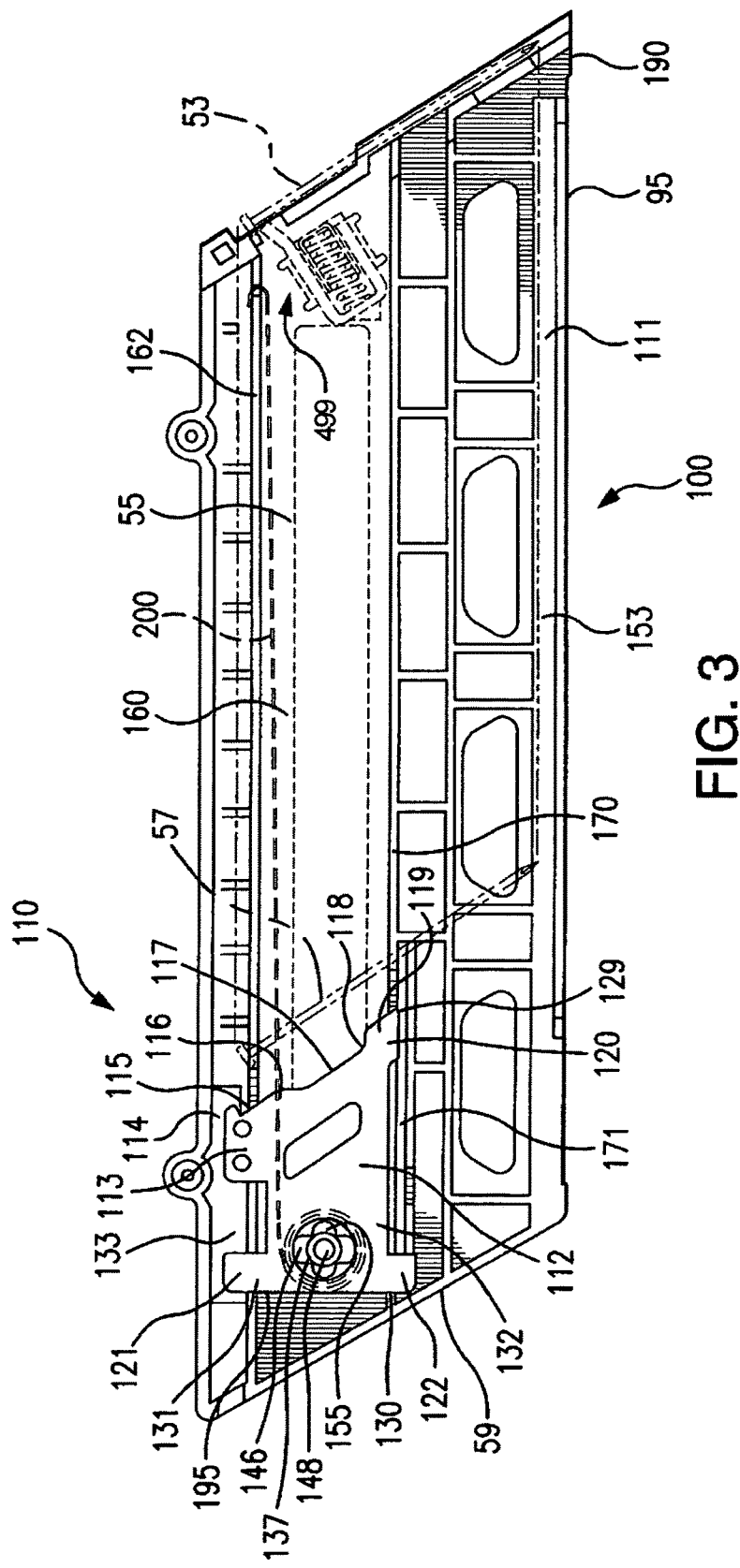
FIG. 3 is a section view from the nail-side of the magazine illustrating the pusher in a retracted state and the magazine loaded with nails.

FIG. 3 is a sectional view from the nail-side 58 of the magazine 100 illustrating the pusher assembly 110 in a retracted state and the magazine 100 loaded with a plurality of nails 55. FIG. 3 also illustrates a lockout 499.

The pusher assembly 110 has a pusher 112 which is configured to push a nail 57 of a plurality of nails 55 which have been loaded into the magazine 100. The pusher 112 has a pusher nose end 129 and a pusher base end 130, as well as an upper pusher portion 131 and a lower pusher portion 132. In the embodiment illustrated in FIG. 3, the pusher 112 has a lower pusher face 119 and an upper pusher face 115. The lower pusher face 119 and the upper pusher face 115 can be configured such that they each can be brought into reversible contact with a nail 57 of the plurality of nails 55 located in the nail track 111 of the magazine 100. The lower pusher face 119 and the upper pusher face 115 can each optionally have an indentation into which a nail can be partially seated. In an embodiment, the pusher 112 can have a nose end notch 117 which is positioned at a location between an upper pusher face 115 and a lower pusher face 119. The pusher 112 and the nail track 111 can be sized to accommodate a collation wrapping (e.g., paper, plastic, band or other material wrapping) of the plurality of nails 55. In an embodiment, a nose end notch 117 can be sized to accommodate a collation wrapping of the plurality of nails 55. Optionally, the pusher nose end 129 can have an upper pusher nose ramp 116 connecting the upper pusher face 115 with the nose end notch 117. The pusher nose end 129 can also optionally have a lower pusher nose ramp 118 connecting the nose end notch 117 to the lower pusher face 119.

The magazine 100 can have one guide, such as lower pusher guide 170, or a plurality of guides which can guide the pusher 112 to a nail 57 of the plurality of nails 55 when the pusher 112 is in an engaged state. The guide can also guide the pusher 112 into a pusher recess 171 to achieve a retracted position of the pusher 112. In an embodiment, an upper pusher recess 133 can have an upper pusher nail head notch 114. The guide can optionally have at least one pusher ramp along which the pusher 112 travels when it is guided in its movement from an engaged state in which the pusher 112 is not in the pusher recess 171 to a retracted state in which the pusher 112 is retracted into the pusher recess 171, as well as during transition from the retracted state to the engaged state.

FIG. 3 illustrates an embodiment of the pusher assembly 112 having a plug head 146 securing in-part the plug 137 by a screw 148 to a pusher assembly 110, as well as illustrating a knob connector opening 155. Like reference numbers in FIG. 1 identify like elements in FIG. 3.

Figure 4:
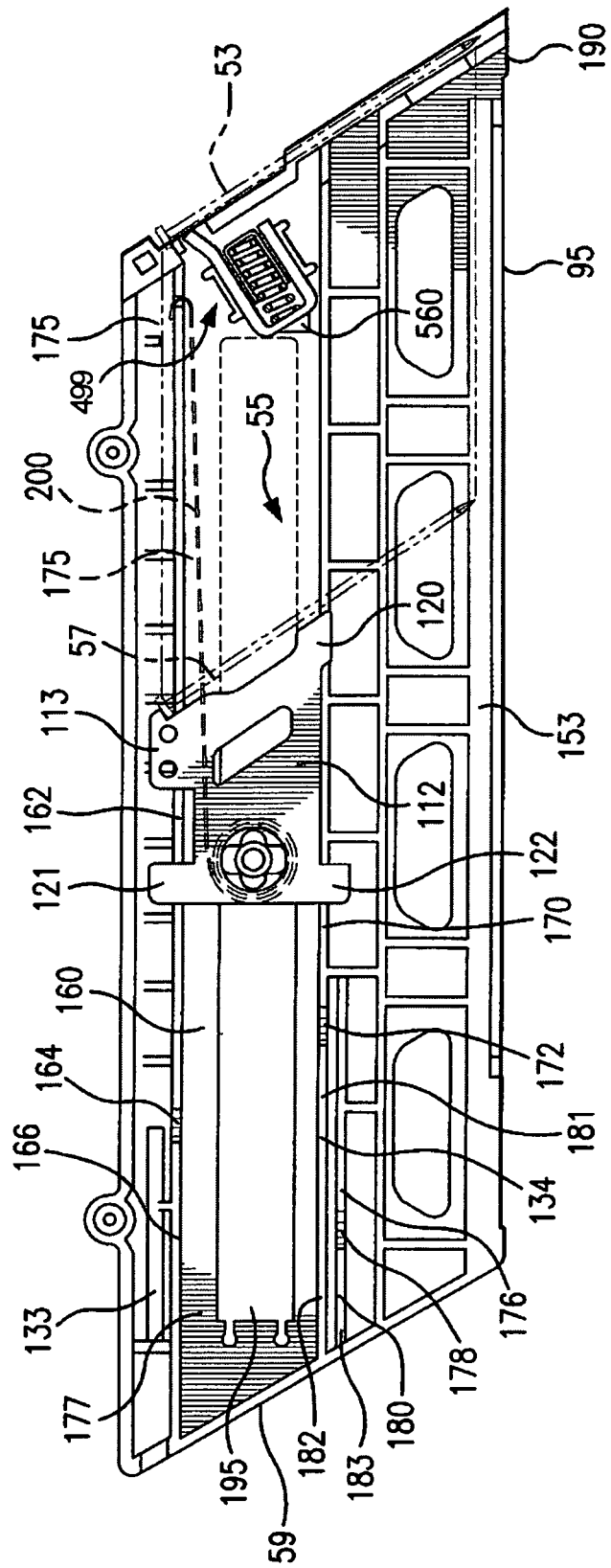
FIG. 4 is a section view from the nail-side of the magazine illustrating the pusher in an engaged state.

FIG. 4 is a nail-side 58 sectional view of the magazine 100 illustrating the pusher 112 in an engaged state. The upper nose prong 113 is guided by an upper pusher guide 162, the lower nose prong 120 is guided by a lower pusher guide 170 and the lower base prong 122 is also guided by the lower pusher guide 170. The spring 200 is biased toward the pusher track nose end 190 and pushes the pusher 112 against the plurality of nails 55 to be fed to the nosepiece assembly 12 for driving. Like reference numbers in FIG. 1 and FIG. 3 identify like elements in FIG. 4. The nail 57 is a nail of the plurality of nails 55. The pusher 112 can be stopped by a mechanical stop or a lockout 499 from forward motion at the pusher track nose end 190.

The lockout 499 is an optional feature of a magazine 100. The lockout 499 can cause a locked out state of the nailer 1 when no nails, or a predetermined number of nails, are present in the magazine.

In an embodiment, the lockout 499 can inhibit the movement of the upper contact trip 310 when a predetermined number of nails (or zero (0) nails) are present in the magazine. This inhibition of movement of the upper contact trip 310 when the lockout 499 is in a locked out state can make the operator aware that a nail is not going to be driven and that it is appropriate to reload nails or to add more nails into the magazine 100. This feature can be used in all modes of operation of a fastening tool, e.g. nailer, including but not limited to sequential and bump modes.

For example in bump mode, the operator can drive a series of nails until a predetermined number of nails (or zero (0) nails) are present in the magazine at which condition the lockout 499 engages and inhibits the movement of the upper contact trip 310 preventing and/or inhibiting a nail 57 from being driven. This circumstance can indicate to the operator that it is appropriate to add one or more nails to the magazine.

A lockout state can prevent driving when a predetermined number of nails, or no nails, remain in the magazine 100.

Figure 5:
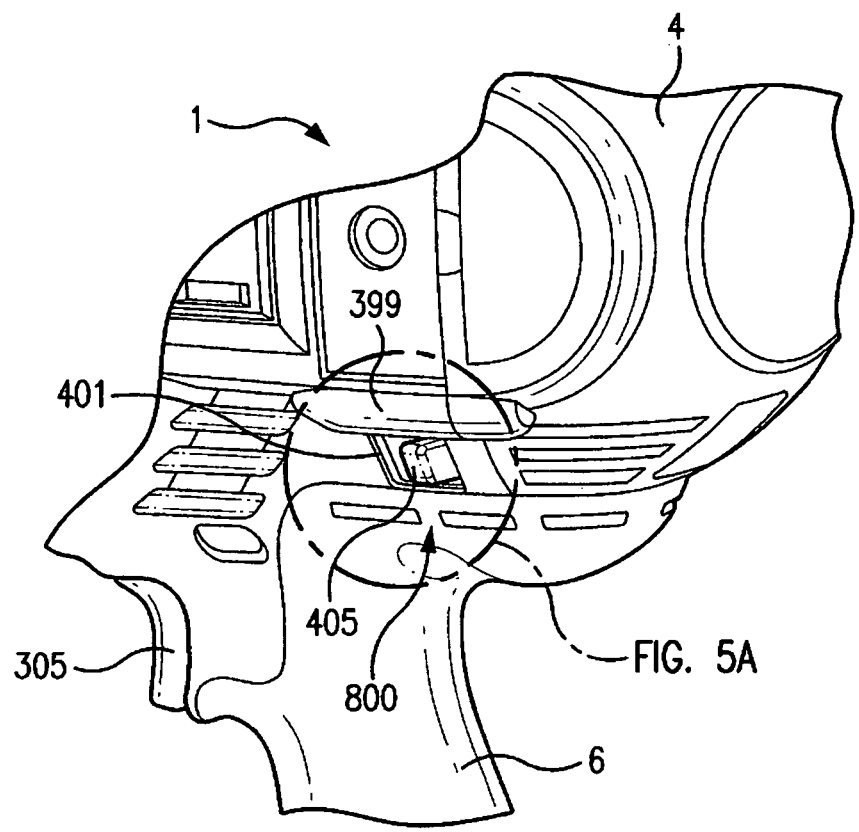
FIG. 5 is a perspective view of a mode selector switch configured such that the switch is in a recessed location and protected from contact with a flat surface upon which the nailer can be placed.

FIG. 5 is a perspective view of a mode selector switch in a recessed location as compared to e.g. a housing portion 399 and protected when the tool is placed upon a flat surface. In an embodiment, the Hall effect mode selector switch can be located such that the switch does not contact a flat surface when the tool is set down on such flat surface.

The operator can change the mode of operation by pushing the slider knob 405 resulting in the movement of the slider knob 405 and the slider 400. The slider knob 405 can protrude through a switch window 401 and is accessible to the operator.

The Hall effect mode selector switch is compact in design. The mode selector switch can be configured for convenience of use by the operator, yet also can be protected from mechanical damage.

In an embodiment, the Hall effect mode selector switch is positioned in the body of the tool such that the operator can readily switch the mode of operation by intentionally moving the slider 400 via contact with the slider knob 405 while maintaining a grip on the handle of the tool. In an embodiment, the operator's thumb can be used to move the slider 400 by applying pressure upon the slider knob 405 while the same hand grips the handle. Like reference numbers in FIG. 1 identify like elements in FIG. 5.

Figure 5A:
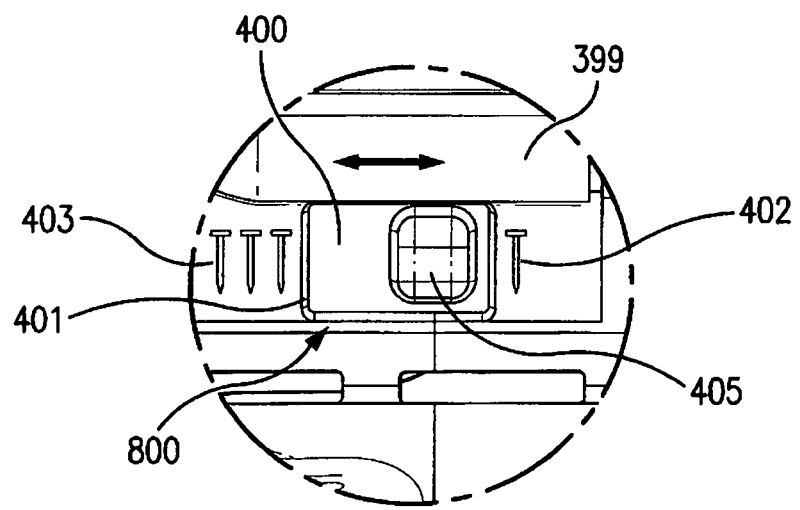
FIG. 5A is a detail of a mode selector switch configured in a nailer housing.

FIG. 5A is a detailed view of the mode selector switch configured in the nailer 1 housing. In an embodiment, the body of the nailer 1 can have one or a plurality of icons visible to the operator to indicate the position of the switch and/or mode. As a non-limiting example, an icon of a single nail 402 formed of raised plastic and positioned in visible proximity to the Hall effect mode selector switch can indicate when the switch is set to sequential mode. In another example, an icon of a plurality of nails 403 (e.g. two nails, three nails, or more nails) formed of raised plastic and positioned in visual proximity to the Hall effect mode selector switch can indicated when the switch is set to bump mode. This disclosure is not limiting as to the orientation of one or a plurality of icons about a mode selector switch or to one or more other icons, or as to the locations of one or a plurality of icons in relation to a mode selector switch or to one or more other icons. In an embodiment, one or more icons are located to be seen by the operator viewing the side of the tool bearing the icon or icons and/or can be felt by the operator's finger(s) touching an icon or more than one icon.

Optionally, bump and sequential icons can be hot stamped and located proximate to the switch window 401. A broad variety of mode designation symbols can be used with such symbols located at a broad variety of locations on a tool. This disclosure should be broadly construed in this regard.

In an embodiment, plastic used in constructing the plastic components of the Hall effect mode selector switch, e.g. potting boat, slider, and power tool can be of recycled plastic. Generally, components of the members disclosed herein can be of recycled materials.

Consistent with a selected mode of driving a nail, the nailer 1 can drive a nail by rotating a motor which drives a trigger mechanism. The microprocessor 1040 (FIG. 11) signals the motor to rotate when it detects that the contact trip 320 and/or contact trip 310 has tripped, as well as the trigger 305 has tripped. Unless the lower contact trip 320 and/or contact trip 310 tripped, and the trigger 305 is also tripped no nail will be driven. Optionally, where a single contact trip is used, the contact trip and the trigger 305 have to both be tripped.

In an embodiment which employs only a single contact trip, the microprocessor 1040 will reset awaiting another sequence of first tripping the single contact trip and then a trip of the trigger 305. Optionally, a number of contact trips can be used.

Two contact trips are illustrated in e.g. FIGS. 1-2. In the sequential mode, the microprocessor 1040 will drive the nailer 1 if the lower contact trip 320 and/or upper contact trip 310 is first tripped followed by a tripping of the trigger 305. In sequential mode, one nail will be driven with each sequence of first tripping the lower contact trip 320 and/or upper contact trip 310 and then tripping the trigger 305. After each nail is driven in the sequential mode, the microprocessor 1040 will reset awaiting another sequence of first tripping the lower contact trip 320 and/or upper contact trip 310 and then a trip of the trigger 305.

In sequential mode, depressing the trigger 305 and then tripping the lower contact trip 320 will not result in the microprocessor 1040 signaling the motor to turn and not result in a nail being driven.

In the bump mode, in an embodiment which uses a lower contact trip 320, the operator can depress the lower contact trip 320 against a work piece and then pull the trigger 305 causing a nail to be driven. Where a single contact trip is used a depressing of the single contact trip and then a pull the trigger 305 can cause a nail to be driven. Optionally, a plurality of contact trips can be used.

Alternatively, in bump mode, the operator can depress the trigger 305 indicating the trigger 305 as tripped to the microprocessor 1040 while the trigger 305 is depressed. In an embodiment which uses a lower contact trip 320, the operator can depress the trigger 305 and repeatedly trip the lower contact trip 320 by pressing it against a work piece at one point after another causing a nail to be driven with each tripping of the lower contact trip 320. This allows the operator to depress the trigger 305, holding it depressed and then bump the nailer 1 across on a work piece causing a nail to be driven into it with each tripping of the lower contact trip 320 (as long as the trigger 305 is depressed). Optionally, a plurality of contact trips can be used.

Two contact trips are illustrated in e.g. FIGS. 1-2. In this example, in bump mode, the operator can depress the trigger 305 indicating the trigger 305 as tripped to the microprocessor 1040 while the trigger 305 is depressed. In an embodiment that uses a lower contact trip 320 and an upper contact trip 310, the operator can depress trigger 305 and repeatedly trip the lower contact trip 320 and/or upper contact trip 310 by pressing the lower contact trip 320 against a work piece at one point after another causing a nail to be driven with each tripping of the lower contact trip 320 and/or upper contact trip 310. This allows the operator to depress the trigger 305, holding it depressed and then bump the nailer 1 across on a work piece causing a nail to be driven into the workpiece with each tripping of the lower contact trip 320 and/or upper contact trip 310 (as long as the trigger 305 is depressed).

In an embodiment where a lower contact trip 320 is used, in bump mode, the operator can first place the nosepiece of the nailer 1 against a work piece tripping the lower contact trip 320 and then pull the trigger 305. In bump mode, the operator can either first trip the lower contact trip 320 or the trigger 305. In bump mode, as long as both the lower contact trip 320 and the trigger 305 have been tripped the nailer 1 will drive regardless of which was first tripped.

Figure 5B:
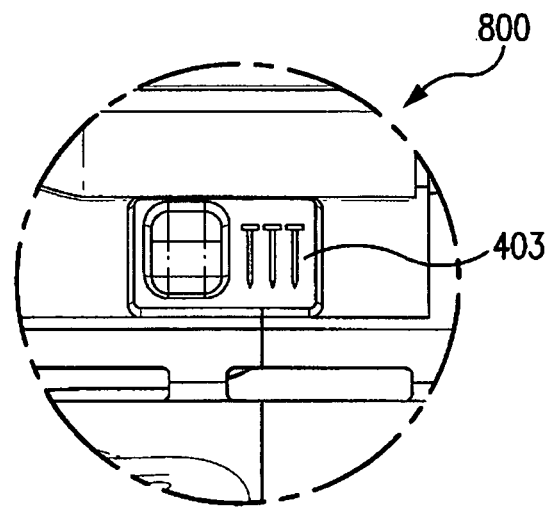
FIG. 5B is a detail of a mode selector switch configured in a nailer housing and indicating an icon for bump mode operation.

FIG. 5B is a detail of a mode selector switch configured in the housing 4 and indicating an icon for bump mode operation. In this example, a selected setting for a bump mode is represented by an icon having a plurality of nails, e.g. an icon of three nails 403.

Figure 5C:
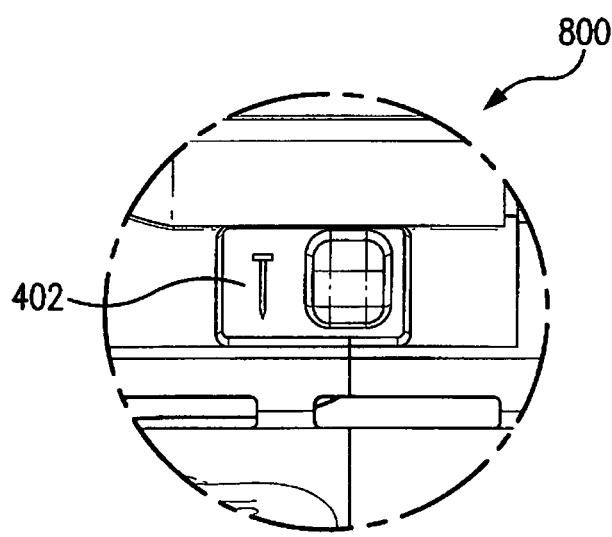
FIG. 5C is a detail of a mode selector switch configured in a nailer housing and indicating an icon for sequential mode operation.

FIG. 5C is a detail of a mode selector switch configured in the housing 4 and indicating an icon for sequential mode operation. In this example, a selected setting for a sequential mode is represented by an icon having a single nail, e.g. an icon of a single nail 402.

Figure 6:
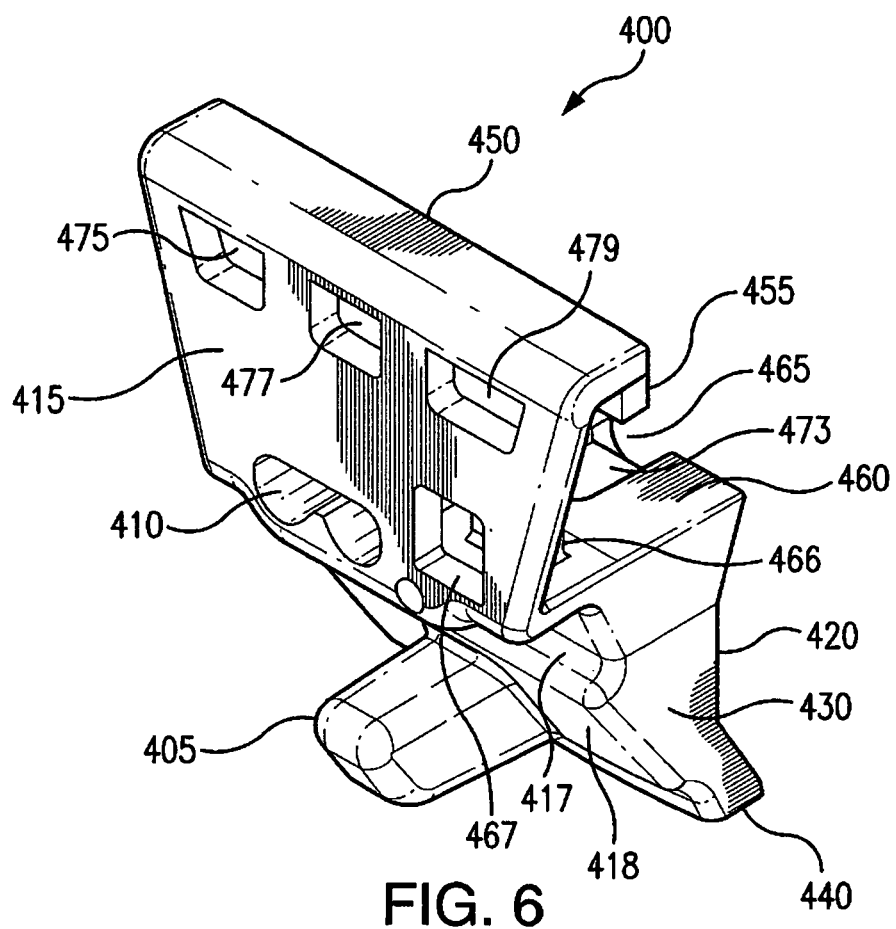
FIG. 6 is a perspective view of a mode selector switch slider.
Figure 10:
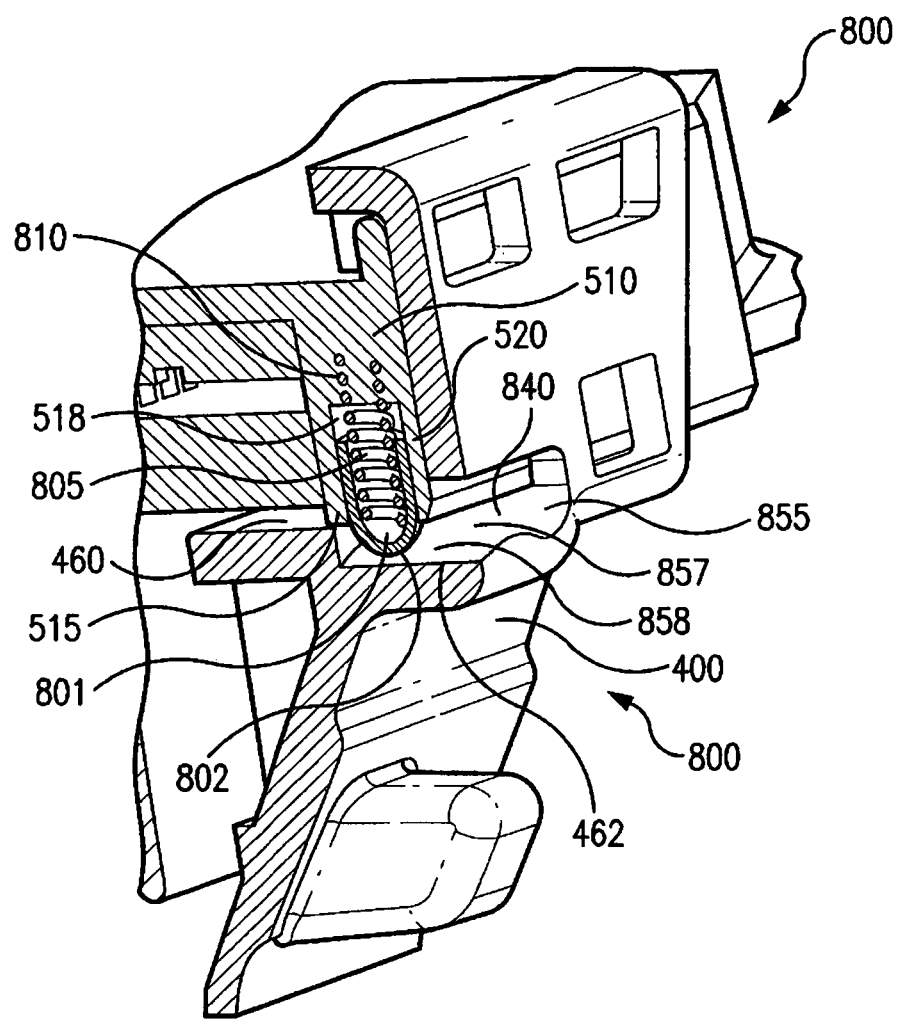
FIG. 10 is a detail view of a mounting of a slider interacting with an index bolt and using a "C"-interlock.

FIG. 6 is a perspective view of the mode selector switch slider 400. In an embodiment, the slider 400 has the slider knob 405 and the slider knob 405 movement can be indexed by an index bolt 801 (FIG. 10). The slider 400 can be seen through an indexing window 410. FIG. 6 illustrates the slider having an outer slider face 415 and a recessed slider knob face 418. The outer slider face 415 and the recessed slider knob face 418 can be connected by a recessed slider face 417. The slider 400 can also have an inner slider face 420.

The slider 400 illustrated in FIG. 6 is of a "C"-interlock variety. This disclosure is not limited regarding the manner of installing the slider and should be broadly construed in this regard. FIG. 6 depicts a "C"-interlock 450 of the slider 400 having a rail lock 455, a sliding interface 460 and a rail guide 466. A lower rail window 467 is provided.

In an embodiment, the slider can have at least one magnet. FIG. 6 illustrates a slider 400 having an interface cavity 465 provided in the sliding interface 460 in which at least one magnet can be placed. In an embodiment, an inner cavity 473 is also provided for placement of at least one magnet.

In an embodiment, the magnets can be overmolded into the slider. A magnet can be overmolded in part or in whole. In overmolding, the magnets can be inserted into a specially designed injection molding tool that can be optionally non-magnetic. The injection molding tool can optionally have magnetic features which facilitate assembly of the magnet back iron in the proper orientation and location relative to one or more magnets. This manufacturing technique reduces assembly errors, e.g. by preventing one or more magnets from improper assembly by having reversed or incorrect polarity orientation, or with the back iron incorrectly oriented or improperly stacked with one or more magnets.

One or more upper rail windows can be provided. This allows the operator to view a rail. Upper rail windows also achieve a reduction in the weight of the slider 400. FIG. 6 illustrates a plurality of upper rail windows 475, 477 and 479. This disclosure is not limited to the number of windows which the slider 400 can be present in the slider 400.

In an embodiment, the upper rail windows 475, 477 and 479 facilitate production of the slider 400 in an open shut injection molding tool without the complication of requiring slides or side pulls. The use of the windows supports manufacturing by magnetic overmolding or overmolding of one or more magnets. In other embodiments, the windows 475, 477 and 479 can be located in positions of the slider 400 which are not in the upper rail, or windows can be located both in the upper rail and elsewhere in the slider 400.

In an embodiment, the Hall effect mode selector can be constructed without fasteners. In an embodiment, the index bolt is used to interface with the slider 400 and provides an indexing movement to the slider 400.

Figure 7:
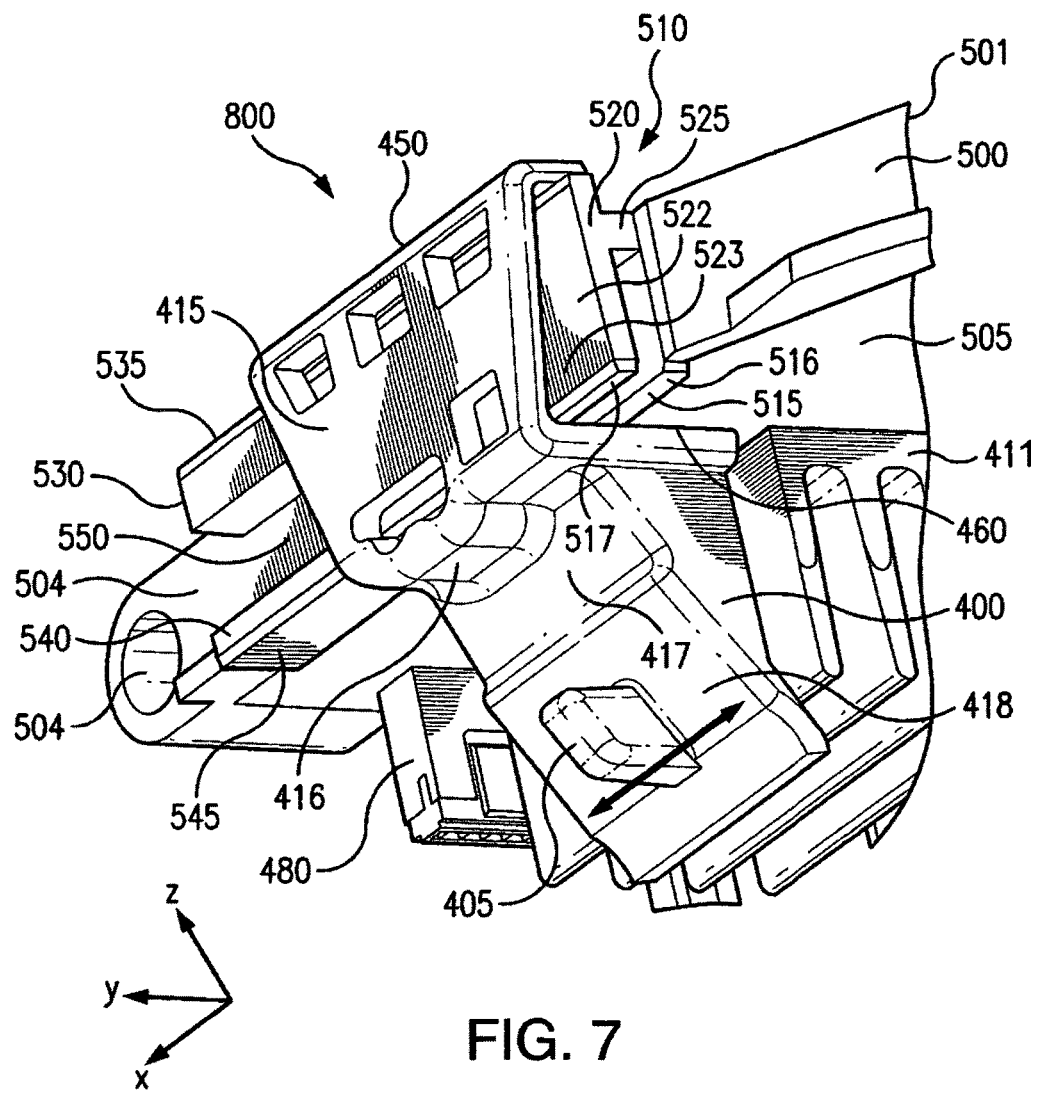
FIG. 7 is a perspective view of a mode selector switch slider mounted on a rail of a potting boat.
Figure 8:
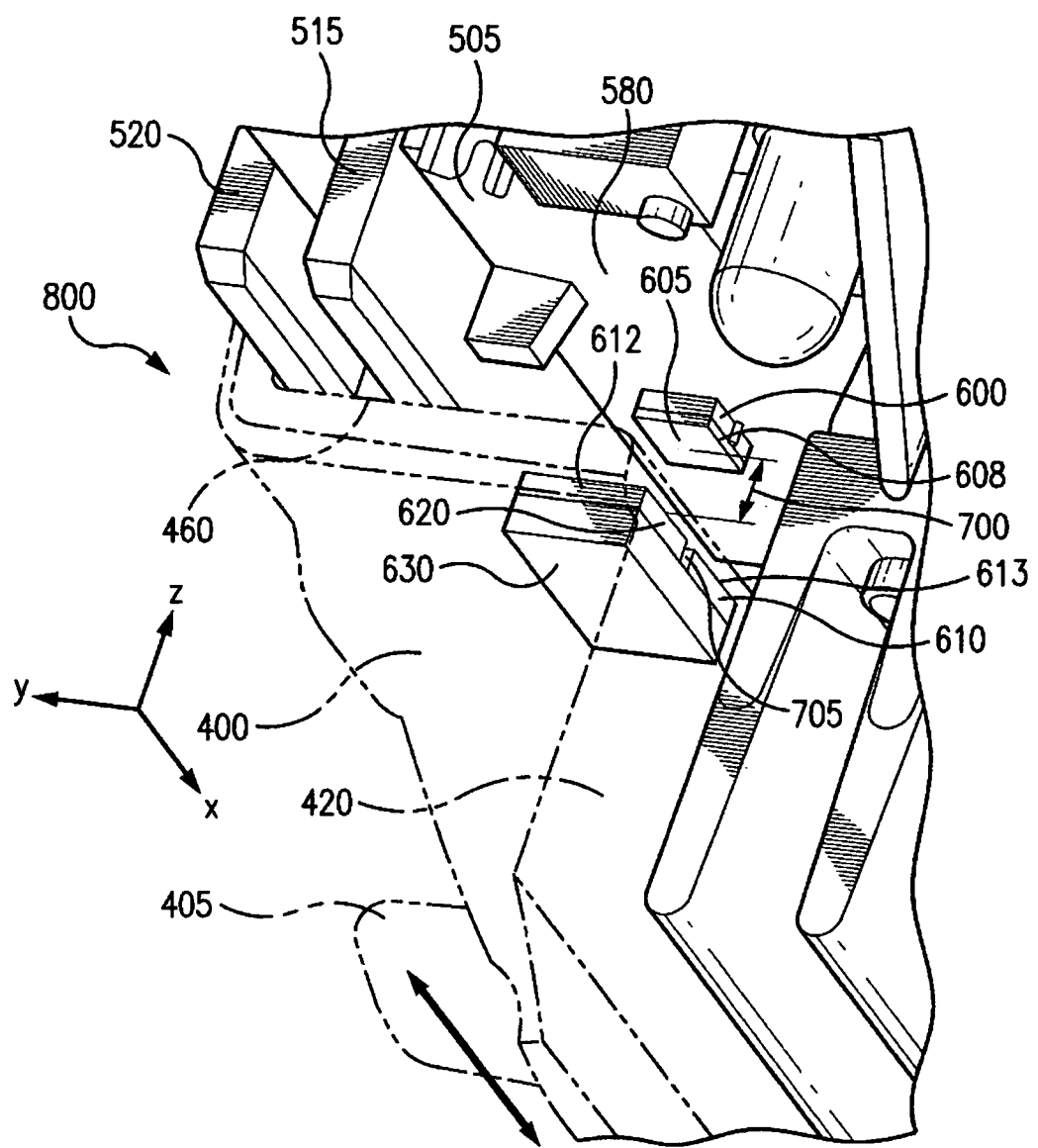
FIG. 8 is a perspective view of a mode selector switch slider having a magnetic source and a circuit board having a mounted Hall effect sensor.

FIG. 7 is a perspective view of a mode selector switch 800 having the slider 400 mounted on a slider rail 510 of a potting boat 500. The potting boat 500 has a potting boat base end (not shown) and the potting boat nose end 504, and can be filled at least in part by a potting 505. The potting 505 can provide physical protection to sensitive components, e.g. the circuit board (PCA and/or PCB), Hall effect sensor and electrical components. Additional components, whether electrical or mechanical can be attached to the potting boat 500 or the potting 505. In some embodiments, the use of the potting 505 is optional, as is the amount of potting used. In some embodiments, is it also optional as to which components are covered or protected by the potting 505. For example, FIG. 7 illustrates in a non-limiting example, a heat sink 411 and a circuit board connector 480 can be used in conjunction with a circuit board 580 (FIG. 8). The potting boat 500 can have a potting boat channel 504 which can be used as a means of connection for assembling the fastening device into which the potting boat is installed.

FIG. 7 illustrates the slider 400 having the "C"-interlock 450, the outer slider face 415 and the recessed slider knob face 418 with the slider knob 405. The outer slider face 415 and the recessed slider knob face 418 can be connected by a recessed slider face 417 and can have a slider recess transition 416.

In an embodiment, the slider 400 is engaged with and can slide along the slider rail 510. The slider 400 can be reversibly fixed in a location along the slider rail 510 by an indexing means, such as an index bolt, a detent or a different means of inhibiting or providing resistance to sliding. In an embodiment, the slider 400 engages the slider rail 510 by the "C"-interlock 450 in conjunction with the sliding interface 460.

In the embodiment of FIG. 7, the slider rail 510 has an inner rail 515 connected to an outer rail 520 by a rail connector 525. The "C"-interlock 450 can latch onto at least a portion of the outer rail 520 by a latching means. A rail latch 455 (FIG. 6) is a latching means which can slidably contact at least a portion of an upper rail face 535 of the outer rail 520. The outer rail interface 416 (FIG. 9) can slidably contact at least a portion of the outer rail face 522. The sliding interface 460 can slidably contact at least a portion of the lower rail face 545.

A portion of the space between the inner rail 515 and the outer rail 520 can form an index bolt channel 518 (FIG. 10).

In the embodiment illustrated in FIG. 7, the outer rail has an upper rail 530 and a lower rail 540 which can be connected by an outer rail bridge 523. In this embodiment, the rail channel 550 is present and located between at least a portion of the upper rail 530 and the lower rail 540. In an embodiment, the lower rail surface 545 can be a member which contacts at least a portion of the inner rail lower face 516 and the outer rail lower face 517, and which can slidably interface with the sliding interface 460.

FIG. 8 is a perspective view of the slider 400 having the slider knob 405 having a magnetic source and a circuit board having a Hall effect sensor.

A magnetometer can be used to achieve embodiments within the scope disclosed herein. A Hall effect sensor is a type of magnetometer. However, other magnetometers can be used in the disclosed mode selector switch. Additionally, a magnetoresistor or magnetoresistive sensor can be used in the disclosed mode selector switch. Broadly, a sensor which can sense a change in magnetic flux which has an output which serves as a basis for a mode of operation decision can be used in a mode selector switch.

There is no restriction as to the type of Hall effect sensor which can be used. Herein, "Hall effect sensor" and "sensor" are used synonymously and interchangeably when referring to a magnetoresistive sensor. Hall effect sensors which can be used include for non-limiting example: a linear Hall effect sensor, a discrete Hall effect sensor, a magnetoresistive Hall effect sensor. An example of a linear Hall effect sensor which can be used is an AKM linear Hall effect sensor model EQ432L operating at 3.3 V (AKM Semiconductor, 1731 Technology Drive Suite 500, San Jose, Calif. 95110). An example of a discrete Hall effect sensor which can be used is a vein Hall effect sensor. Hall effect sensors that have built-in amplifiers can be used. Hall effect sensors that do not have built-in amplifiers can also be used.

This disclosure is not limited to the configuration of one or more members (e.g. sensor(s), magnetoresistive component(s), magnetometer(s), magnet(s) and/or moving par(s)) of a Hall effect mode selector switch. Additional non-limiting examples of switches which can be used are a push button, a rotating switch, a depress and slide switch. A rotating switch having a single magnet can be used. Up and down (e.g. Z-axis of FIGS. 7-8) switches, rather than those that move from side to side (e.g. X or Y-axis of FIGS. 7-8), can also be used. A switch using a Hall effect sensor can be used.

Magnets and sensors could be incorporated into the tool at a variety of locations that allow movement of one or more magnets opposite to or respective to a Hall effect sensor.

In an embodiment, a two-position switch can allow the operator a choice of at least first and second modes of operation of the fastening tool. Current tool designs use mechanical toggles, alternate triggers that must be changed to switch between modes, and roll selectors. Failure of a mode selector switch is managed by operator protection protocols and safeguards. In one embodiment, conditions of switch failure, mode failure or operation out of specification can cause the microprocessor 1040 to set the tool to sequential mode operation. In an embodiment, all failures will cause the microprocessor 1040 to set the tool to sequential mode operation.

This disclosure is not limited in regard to a means to place or fix one or more magnets for use in the Hall effect mode selector switch. A magnet can be affixed to a member of the tool and/or the tool potting. Alternatively, plastic can be molded over the magnet.

The magnets can be configured at various distances and in a number of configurations in relation to a Hall effect sensor. One magnet, or a number of magnets can be used to provide input to the Hall effect sensor. Magnets of different strengths and different polarities can be used. In some embodiments, the greater the number of magnets used, the greater the number of mode settings possible. Likewise, the greater the number of different polarities and differences in magnet strength or arrangement used, the number of mode settings possible. A location not having a magnet, or space between magnets, can also be used to provide input to the Hall effect sensor regarding a mode status or to cause a mode switch.

In embodiments which are exposed to one or more magnetic fields not originating from a magnet of the switch mechanism, a zero flux setting can be avoided to provide improved performance of the switch. The zero flux setting prevents an accidental switching of modes resulting from an outside magnetic field.

FIG. 8 illustrates an embodiment having a circuit board 580 having a Hall effect sensor 600. In an embodiment, the circuit board 580 is mounted to the potting boat base portion 501 (FIG. 7) and can be covered by the potting 505. FIG. 8 illustrates a slider 400 slidably mounted on the inner rail 515 and the outer rail 520 of the potting boat 500. The sliding interface 460 is shown in slidable contact and guided by the inner rail 515 and the outer rail 520.

Optionally, the magnets can be a first magnet 610 and a second magnet 620. The first magnet 610 and the second magnet 620 are illustrated proximate to one another, for example adjacent to one another. Optionally, the first magnet 610 and the second magnet 620 can have a magnet separation space 705 between the first magnet 610 and the second magnet 620. The first magnet 610 and the second magnet 620 can be positioned coplanar in the slider 400, or can be offset. The placement of one or more magnets which can affect the Hall effect sensor can vary widely. One or more magnets can be positioned to affect the Hall effect sensor and indicate the position of the slider along the slider rail 510.

In an example embodiment, the configuration illustrated in FIG. 8 can set the power tool to operate in bump mode.

In an embodiment, a back plate 630 can be used to enhance a magnetic effect of a magnetic source on the Hall effect sensor 600. One or more magnets can use the back plate 630. One or more back plates can also be used. Optionally, a back plate separation space can be used between a magnet and a pack plate or between multiple back plates. In the embodiment of FIG. 8, the first magnet 610 and the second magnet 620 are adjacent to the back plate 630. Optionally one or more magnets can be in contact with the back plate 630, or proximate to the back plate 630. FIG. 8 illustrates the first magnet 610 and the second magnet 620 in contact with the back plate 630.

In an embodiment, a back plate (or back iron) can be used with one or more magnets to increase their magnetic field strength without increasing the amount of magnetic material. This achieves a decreased cost of manufacture.

FIG. 8 illustrates a sensing distance 700. The sensing distance 700 is to be broadly construed as a distance between a magnetic source and the Hall effect sensor 600, or a sensing element thereof. FIG. 8 illustrates an embodiment where the sensing distance 700 is a perpendicular distance measured from the inner magnet face 612 of the first magnet 610 to the facing surface 605 of a sensing element 608 of the Hall effect sensor 600.

A sensing distance can be determined from a location on a sensor to a location of a magnetic source; or to a location on a member having a magnetic source. Flexibility exists in measurement of a sensing distance. Such flexibility is useful when it is difficult to determine, specify, fix or set the precise location of a sensing element in a sensor, a sensor, or the precise location of a magnetic source in a member. The switch disclosed herein can function with a wide range of tolerance.

In one case, a sensing distance 700 of 6 mm is used. In a non-limiting example sensing distances of greater than 0 to less than 10 mm can be used (e.g. 0.5 mm, 3 mm, 4 mm to 10 mm). In an embodiment, the sensing distance can be 5 mm.

The slider 400 can have a "throw". The "throw" is a distance over which a point of the slider 400 is moved to effect a change the mode of the nailer 1 from one mode to another. The term "throw" is to be broadly construed as the amount of movement of the slider 400 which will effect a change in mode of a power tool. Also, as broadly construed the "throw" is the relative displacement between a magnetic source and a Hall effect sensor (or magnetometer, or magnetoresistor). Throw can also be set or expressed in relation to sensing distance, e.g. throw is a percentage of, fraction of or ratio to sensing distance. In an embodiment, the throw of the slider 400 can be equal to the perpendicular distance between the sensor and a magnet. In another embodiment, the throw is within ±0.01 to 2.00 mm of the perpendicular distance between the Hall effect sensor and a magnet.

When a "throw" is executed it can cause a "travel" to occur. "Travel" generally is considered herein to be the change in a distance between a megnetometer's sensing element, or a sensor, and one or more magnetic source. Many designs can use a variety of moving parts which can be used to cause or contribute to a "travel". The sensing distance can equal, or be about the value of, the throw (or travel) distance. In another embodiment, the throw does not equal the sensing distance, and can also be less than, a fraction of, greater than, or multiple of, the sensing distance. In an embodiment, the throw can be about equal to the sensing distance 700. Either or both of the sensing distance 700 and/or throw can be a basis for selecting a magnet size.

In embodiments where the Hall effect sensor is stationary and a magnet is moved, the value of a travel is the distance moved by the magnet relative to the stationary Hall effect sensor. Likewise, if a number of magnets are used, the value of a travel is the distance moved by a magnet, or magnets, of the number of magnets.

In an embodiment, one or more N35 and/or N35SH magnets can be used. Magnets different than these can be used (e.g. Neodymium Iron Boron magnets). Also, magnetic sources which are not magnets can be used, e.g. magnetized plastics, or magnetically infused plastics (e.g. slider having magnetized portions, magnetized elements, magnetized components, or magnetized plastic portions).

In an embodiment, the mode selector back plate can be a low carbon steel satisfying AISI 1008 or an equivalent standard. Optionally, a film of stamping oil and/or rust inhibitor can be present on the mode selector back plate. In an embodiment, the maximum material thickness variation on the mode selector back plate can be 0.013 mm or less.

In an embodiment, a 2 mm throw is used. A 2 mm throw of the slider 400 results in a 2 mm travel of one or more magnets.

In an embodiment, the sensing distance can be 7 mm and the throw of the slider 400 can be set to 7 mm. Sensing distances and throws of smaller dimensions can be used. In another embodiment, small magnets and a shorter sensing distance can be used such that the sensing distance can be 2 mm and the throw of the slider 400 and travel can be set to 2 mm. A minimum distance, e.g. less than 1 mm, can be used between a magazine and a Hall effect sensor.

An embodiment of the Hall effect mode selector switch can have a compact tolerance stack-up.

A "tolerance stack-up" is the total distance between the magnetometer (e.g. Hall effect sensor) and a magnet accounting for distances of tolerance in all directions, e.g. X, Y and Z directions. The mechanical tolerance, also referred to herein as "tolerance" is the integral value of the various dimensional variances which, during construction, affect the final sensing distance and final throw distances as constructed.

The tolerance stack-up can be set in a mechanical design of a power tool based upon the ratio of a throw distance vs. a mechanical tolerance(s) of construction. The mechanical tolerance can account for the variance of placement of components of the mode selector switch during construction. For example, the exact location of the Hall effect sensor on the circuit board, or in relation to the slider 400 can vary. In another example, the location of a magnetic source in the slider 400 can vary. The location of the rail, the height of the potting boat, the location of the printed circuit board in the potting boat and other dimension can all vary during manufacturing and assembly. Each of the sensing distance, throw and travel can have a variance from a nominal design specification during manufacturing and assembly of a power tool and the components it includes. The tolerance can include both sensing distance variance, throw variance and travel variance.

In an embodiment, tolerance stack-up can be set as a function of throw distance vs. tolerance. In an embodiment, the throw vs. tolerance is 1 mm tolerance per 6 mm throw. The value of 1 mm of tolerance is used as the summation of the tolerance of the parts, in a non-limiting example the potting boat, the rail(s), the circuit board, the sensor (e.g. Hall effect sensor), the slider, the magnet and the casing.

The closer the magnetic source and the magnetometer the shorter the throw. In an embodiment, the variance of the tolerance stack-up can be ±1 mm in a vertical direction measured from the face of a sensor (e.g. Hall effect sensor) to a face of a magnet. In another embodiment the variance of the tolerance stack-up can be ±0.5 mm in a vertical direction measured from the face of a sensor (e.g. Hall effect sensor) to a face of a magnet. Thus, the sensing distance 700 can be a value having a tolerance.

In another embodiment the throw vs. tolerance is 2 mm tolerance/6 mm throw.

Tolerances can be set to account for dimensional variances in a traditional X, Y, Z coordinate system. In an embodiment, the tolerance accounts for a vertical variance (Z vector) having a range of from ±0.5 mm to ±1.0 mm.

In another embodiment, a ratio of throw to sensing distance is 1:1 and can include a variance such that the ratio is 1±1 mm:1±1 mm. The variance in such ratio can be a larger or a smaller value. In an embodiment, the ratio of throw to sensing distance is 7 mm: 7 mm (ratio of 1:1). The ratio can also be 7 mm±1 mm: 7 mm±1 mm. Likewise, the variance can be a larger or a smaller value. In another embodiment, the ratio throw (or travel) to sensing distance is 6 mm: 6 mm (ratio of 1:1). The ratio can also be 6 mm±1 mm: 6 mm±1 mm. Likewise, the variance can be a larger or a smaller value. In yet another embodiment, the ratio throw to sensing distance is 5 mm: 5 mm (ratio of 1:1). The ratio can also be 5 mm±1 mm: 5 mm±1 mm. Likewise, the variance can be a larger or a smaller value.

The throw distance can range from 0 mm<$X_{throw}$ mm<15 mm, or even have a value as great as within a range of 30 mm to 50 mm.

In an embodiment, the throw/sensing distance is approximately 1:1. For example, the throw distance/the sensing distance 700 is approximately 1:1.

A non-contact Hall Effect sensor (or any kind of mode selector switch) and a set of magnets in a power tool can be arranged in a sliding or movable linkage. A mode switch for a power tool (e.g. a nailer) can include a linear or non-contact Hall Effect sensor and one or more magnets which are insert molded into the sliding or movable linkage. In an embodiment, with two magnets, the magnets can have opposite polarities facing the sensor (e.g. Hall effect sensor). In an embodiment, the two magnets can be positioned side-by-side such that a transition in polarity (and/or flux) can occur and can affect the sensor (e.g. Hall effect sensor) upon movement of one or more of the magnets. Additionally, each of the magnets can be placed adjacent to a back iron, such as the back plate 630, to increase the magnetic flux of each magnet without increasing the cost.

A linear Hall effect sensor used in conjunction with two magnets which have opposite polarities facing the Hall effect sensor provide the ability to have a short throw switch (e.g. 6 mm).

In an embodiment, bump mode operation will only be active if flux is seen within a certain range within the range of the Hall saturation voltages (and no flux voltages −1.65 V to 3.0 V with a 3.3 V Vcc for this embodiment).

In an embodiment, a Hall effect sensor 600 is placed at a distance opposite from the first 610 and second 620 magnets. In an embodiment, a first magnet 610 can be placed such that its North polarity ("N") can face the Hall effect sensor 600. A second magnet 620 can be placed such that its South polarity ("S") can face the Hall effect sensor 600.

In another embodiment the magnet polarities of two respective magnets, or of adjacent magnets, which face the Hall effect sensor can be the opposite of each other, i.e. the first magnet 610 can be placed such that its South polarity can face the Hall effect sensor 600 and the second magnet 620 can be placed such that its North polarity can face the Hall effect sensor 600. In yet another embodiment, both the first magnet 610 and the second magnet 620 can have the same polarity (e.g. both North polarity or both South polarity) facing the Hall effect sensor 600, or can be magnets of different strengths or use other characteristics to distinguish each magnet's affect on the Hall effect sensor.

The Hall effect sensor 600, the first magnet 610 and the second magnet 620 can be positioned such that when the relative position of the first magnet 610 and the second magnet 620 in relation to the sensor changes, the Hall effect sensor 600 and the related circuitry can identify the change and execute the operator's desired change in operational mode.

In the embodiment illustrated in FIG. 8, the distance between the facing surface 605 of the sensing element 608 of the Hall effect sensor 600 and the face 613 of the first magnet 610 is the sensing distance 700. A sensing distance used in a Hall effect mode selector switch is dependent upon the specifications of the Hall effect sensor 600, as well as the characteristics of the magnetic source used.

In embodiments with a number of modes, the slider (or a number of sliders) can have a number of respective throw distances which can be correlated to (or indexed to) the number of modes.

In an embodiment, the throw can be about equal to or greater than the sensing distance. The throw of the slider 400 can be greater than 3 mm.

In an embodiment, the slider 400 having a magnetic source moves relative to the Hall effect sensor. In another embodiment, the magnetic source can be set in fixed position and the magnetometer, magnetoresistor or Hall effect sensor can move. In such case, it would be the sensor which has a "throw". The "throw" is associated with the member which can move.

Figure 12A:
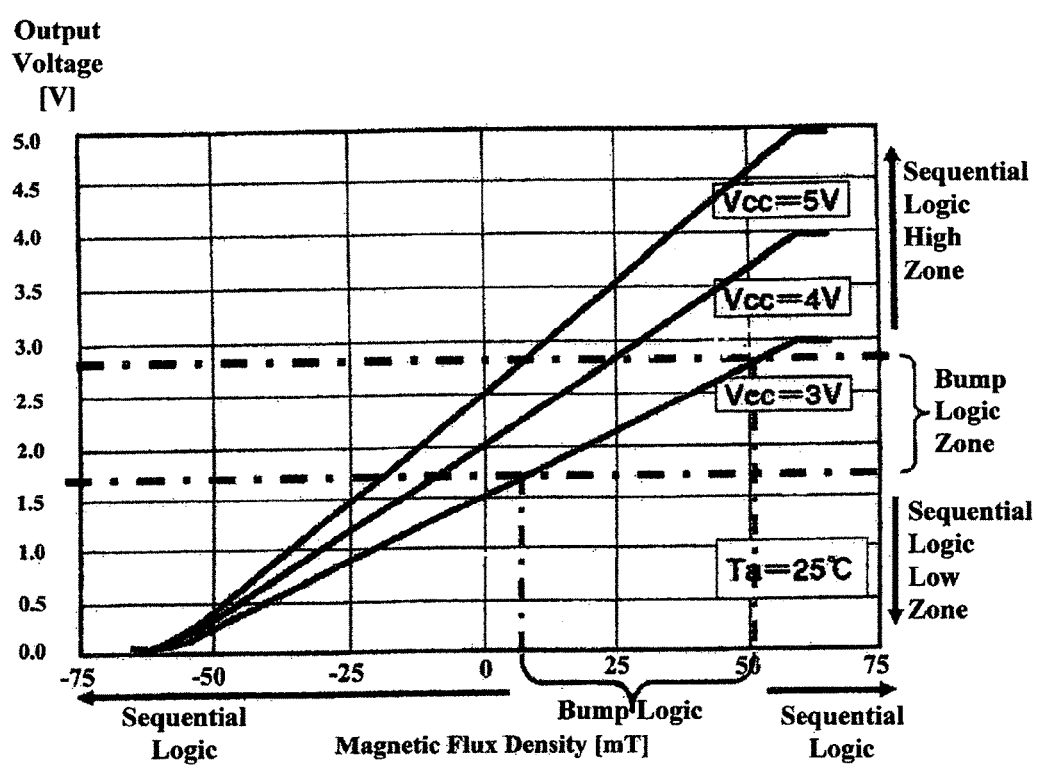
FIG. 12A is a graph of three embodiments of Mode of Operation Characteristics of a power tool at three different Vcc values.

In an embodiment, a slider bears a magnet and a throw of the slider causes the magnet to be moved in relation to a Hall effect sensor, resulting in a travel. In FIG. 12A, data output voltage and flux density in relation to travel is illustrated.

In one embodiment, the slider 400 can be moved to cause a change in modes from a sequential mode to a bump mode. In an embodiment, the slider 400 can be moved to switch the nailer 1 into and out of a locked or neutral mode and/or into a bump or sequential mode.

The throw of the slider 400 can be a distance having a value required by the sensitivity of a Hall effect sensor 600 used in view of the source of magnetism used to allow the Hall effect sensor to exhibit a change in output voltage for mode selection, setting and control. For example, mode selector switch throws can range from as large as 30 mm to as small as 1 mm or less (with travels of the same range). In one embodiment, the mode selector switch throw is 30 mm. In another embodiment, the mode selector switch throw is 20 mm. In another embodiment the mode selector switch throw of a slider is 6 mm. And yet another example, the mode selector switch throw of a slider is 3 mm.

The throw used in a mode selector switch can be any value of distance which results in a change in the output signal from the Hall effect sensor 600 to indicate to the microprocessor 1040 that the mode selector switch has been switched into a different mode or is in a mode as a result of a change. In an embodiment, no change in output signal from the Hall effect sensor 600 can be read by the microprocessor as no change in mode, or that a mode is maintained. The examples of throws and travels indicated herein are not intended to be limiting and this disclosure should be broadly construed. For example, any throw (or any travel) distance in a range of from greater than 0 to less than 50 mm can be used. Such changes in distance can be sufficient for the Hall effect sensor 600 to produce output voltages based on magnetic field flux of sufficient difference for the microprocessor 1040 of a nailer (or power tool) to identify a mode switch, or execute a mode switch. Such functional ranges of distance are intended to be within the scope of the disclosure of this application. Likewise, throws which are greater than 50 mm can indicate a switch in mode to the microprocessor 1040 are also intended to be within the scope of this application for a tool which uses them.

Robustness and reliability of a power tool can be achieved by using a non-contact Hall Effect sensor. In an embodiment, a set of two magnets can be insert molded into a sliding linkage, e.g. the slider 400. The design disclosed herein is robust in nature. In an embodiment, the Hall effect sensor is protected in potting compound and the plastic linkage is a very robust part. In an embodiment, even if the linkage breaks, it can be replaced without needing to replace the entire switch module.

Figure 8A:
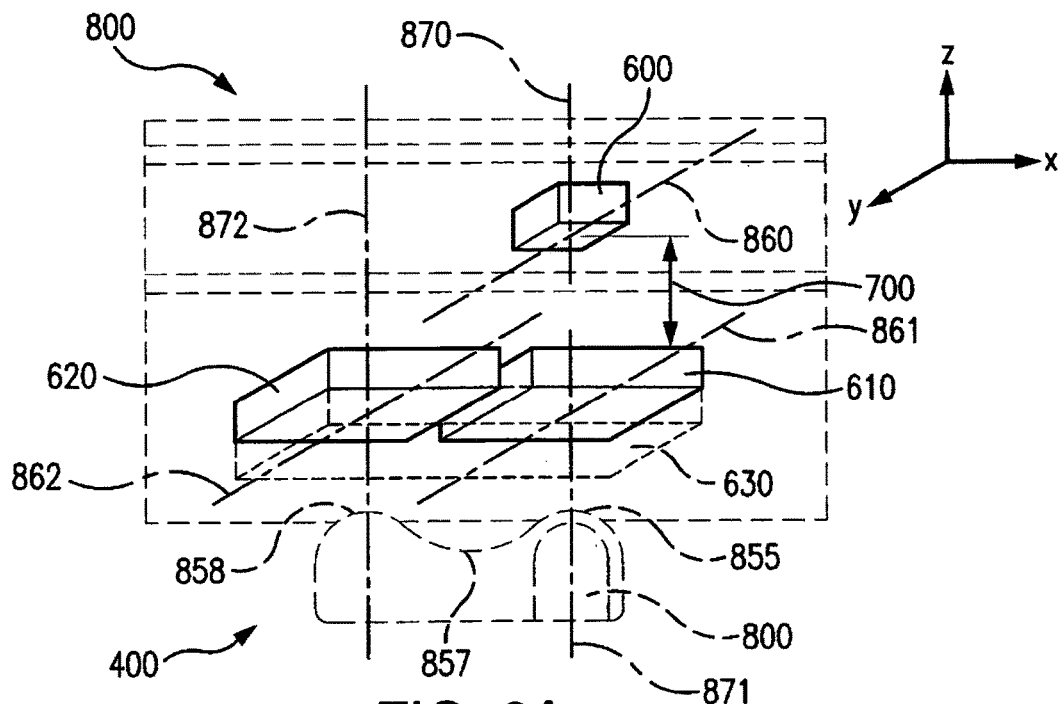
FIG. 8A is a detail view of a first magnet positioned to cause or maintain a first mode of operation.
Figure 8B:
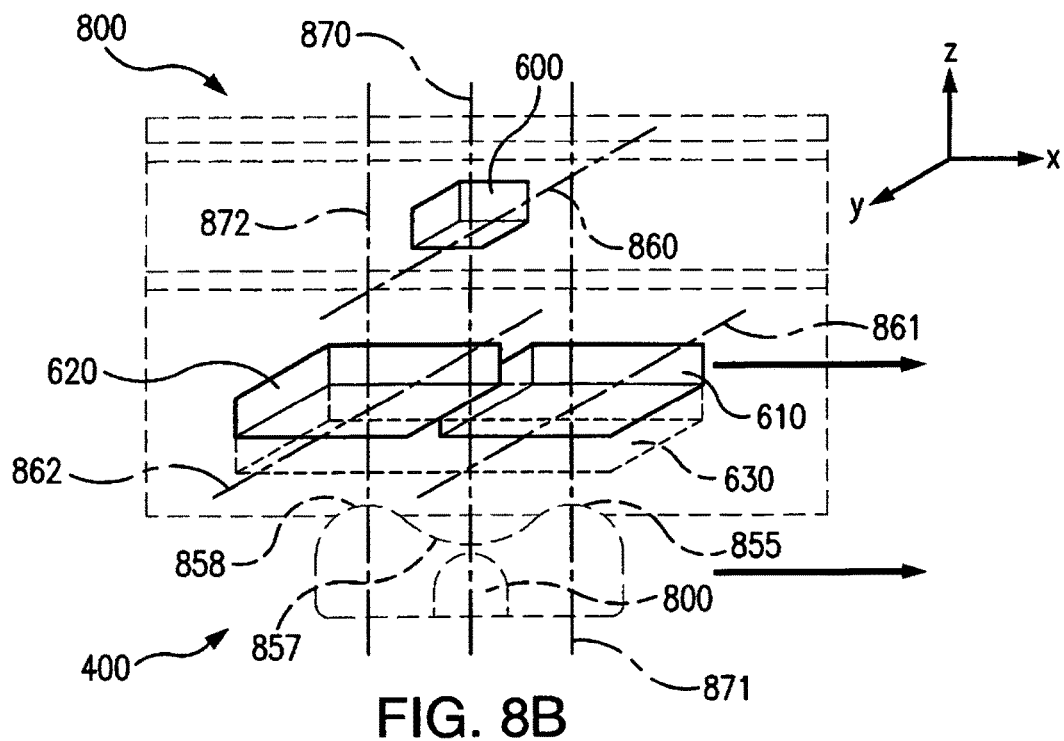
FIG. 8B is a detail view of a slider being moved to cause a change in operational mode.
Figure 8C:
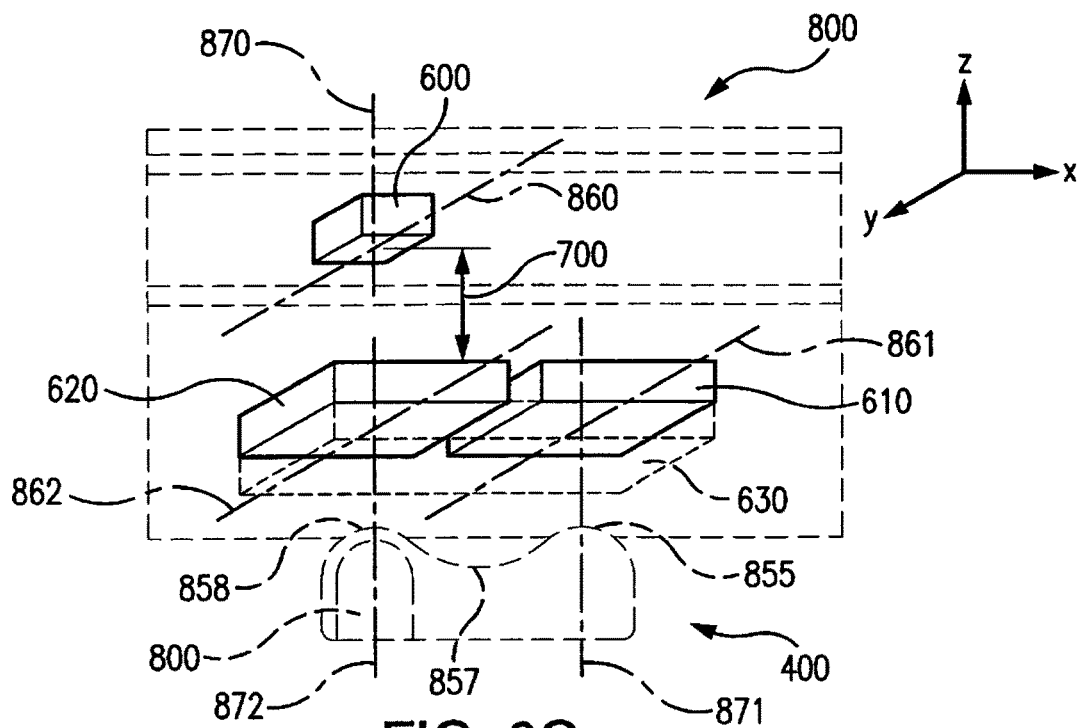
FIG. 8C is a detail view of a second magnet positioned to cause a second mode of operation.
Figure 8D:
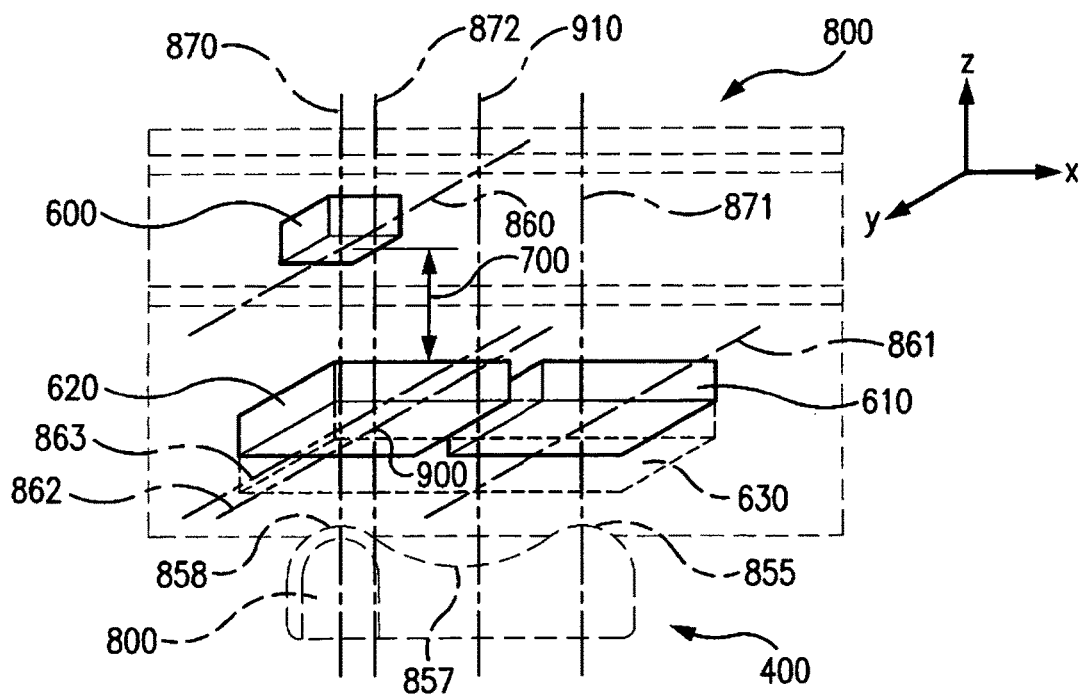
FIG. 8D is a detail view of a slider moved to locate the second magnet in a skewed position.

In one embodiment as illustrated in FIG. 8D, the throw can be skewed. FIG. 8D illustrates a throw which is skewed such that the mode selector switch does not switch modes from sequential mode to bump mode until it is placed in a position over a magnet which is skewed away from the zero crossing of magnetic flux density present in its throw path (FIG. 12A). In an embodiment, the skew as shown in FIG. 8D is 1 mm and can be a skewed sequential setting for a sequential mode of operation. In one embodiment, the first magnet 610 (FIG. 8) can have a North pole which faces the Hall effect sensor 600 (FIG. 8) and the second magnet 620 having a South pole which faces the Hall effect sensor 600. In this embodiment, the second magnet 620 has a second magnet centerline 872 and the Hall effect sensor 600 has a Hall effect sensor centerline 870.

FIG. 8A illustrates an embodiment having a configuration of a slider having two magnets with a backplate. In this embodiment, the magnets can affect a magnetoresistor. FIG. 8A illustrates a first magnet 610 and a second magnet 620 which can be positioned by the slider to be at a location to affect the Hall effect sensor 600. In an example embodiment, the configuration illustrated in FIG. 8A in which a first magnet 610 is positioned generally across from and affecting the Hall effect sensor 600 can set the mode selection to bump mode. The Hall effect sensor 600 experiences a change in flux when the first magnet 610 is moved.

The first magnet 610 can be generally positioned in a location affecting the Hall effect mode selector switch. As such, this disclosure is not to be limited to any particular configuration of the first magnet 610 and the Hall effect sensor 600.

In an example embodiment, the configuration illustrated in FIG. 8A can set or maintain the power tool to operate in bump mode.

In the example of FIG. 8A, the travel location of the second magnet centerline 872 corresponds to 0 mm as illustrated in FIGS. 12A-12G.

In FIG. 8A the first magnet centerline 871 is not in a skewed position in reference to the Hall effect sensor centerline 870. In FIG. 8A the first magnet centerline 871 and a Hall effect sensor centerline 870 can be collinear.

FIG. 8A illustrates the slider 400 having a first notched surface 855 and a second notched surface 858. The first notched surface 855 and the second notched surface 858 can be connected by an indexing transition bump 857 (e.g. FIG. 10).

Figure 9:
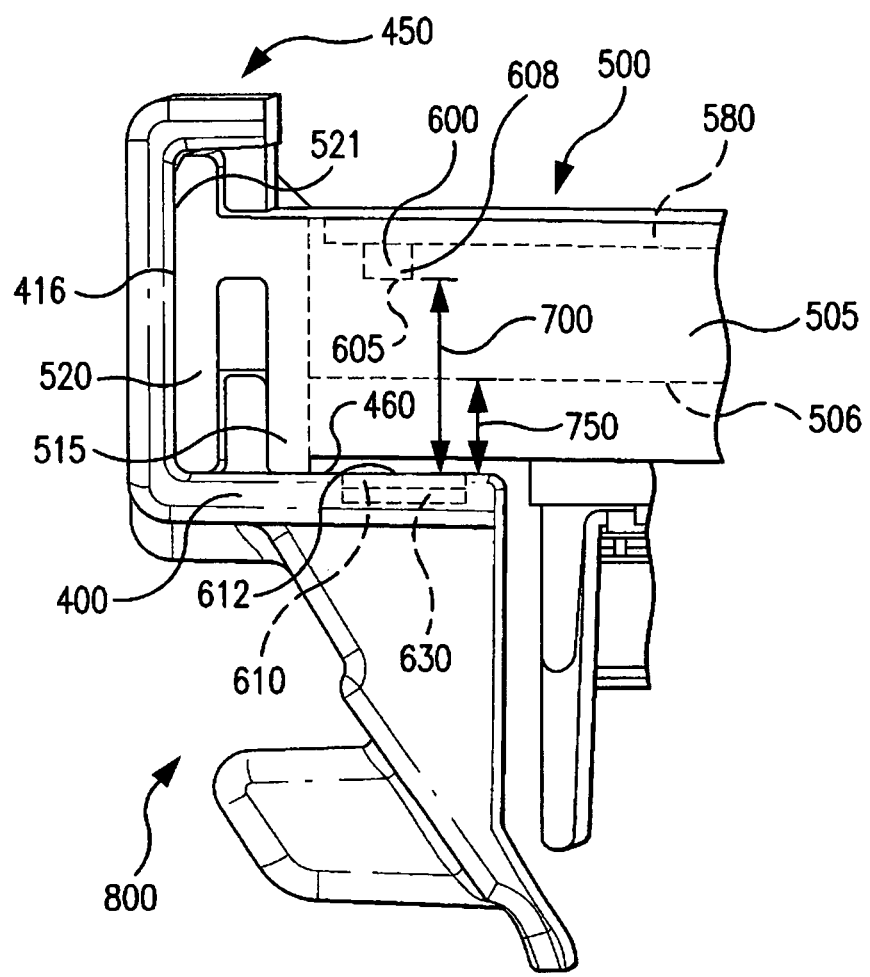
FIG. 9 is a detail view of a slidable mounting of a slider using a "C"-interlock.

Like reference numbers in FIGS. 8, 9 and 10 identify like elements in FIGS. 8A-8D. Like reference numbers in FIG. 8A identify like elements in FIGS. 8B-8D.

FIG. 8B illustrates an embodiment having a configuration of a slider having two magnets with a back plate. In this embodiment, the magnets can affect a magnetoresistor. FIG. 8B is another example of the embodiment illustrated in FIG. 8A. FIG. 8B illustrated the movement of the slider 400 such that the first magnet 610 moves a distance away from the Hall effect sensor 600. In an example, such movement can disengage bump mode. For example, the switching illustrated in FIG. 8B can be the movement of the slider 400 to cause a switch from bump to sequential mode. In the illustration of FIG. 8B, as the slider 400 is moved, the second magnet 620 moves to a location closer to the Hall effect sensor 600.

As illustrated in the example of FIG. 8B, when first magnet 610 moves away from the Hall effect sensor 600, the second magnet 620 moves closer to the Hall effect sensor 600. During the movement of the slider 400, in the example embodiment of FIG. 8B a location is reached where the Hall effect sensor centerline 870 is projected to be between a first magnet 610 and a second magnet 620. In this example embodiment, this location corresponds to zero point of flux density as illustrated in FIGS. 12A-12F. In FIG. 12G, this point occurs at a travel between 2.49 mm and 2.51 mm, e.g. at 2.50 mm. This point can be a point where output voltage from the Hall effect sensor 600 can have a value of be Vcc/2. This location where the Hall effect sensor centerline 870 is projected to be between the first magnet 610 and the second magnet 620 can be referred to as a "zero crossing" point having a value of flux density affecting the Hall effect sensor 600 being a zero value. In an embodiment, the zero crossing can occur when the Hall effect sensor centerline 870 is at location occurring at a value which is one half (½) of the distance between the first magnet 610 and the second magnet 620.

For example, the orientation of the first magnet 610 illustrated in FIG. 8B can correspond to a travel of 2.50 as illustrated in FIGS. 12A-12G.

In an example embodiment, the configuration illustrated in FIG. 8B can represent a transition in power tool operation from bump to sequential mode.

FIG. 8C illustrates an embodiment in which the second magnet 620 has been positioned at a location generally across from and affecting the Hall effect sensor 600. In an example, this configuration can cause to occur, set, or maintain a sequential mode of operation. FIG. 8C is an example of the completion of a switching from a bump mode to a sequential mode, as illustrated in FIGS. 8A-8C. The example switching can also be executed in the reverse order to switch from sequential to bump mode, e.g. as illustrated by viewing the figures in a sequence of from 8C (bump mode) to 8B (switching) to 8A (sequential mode).

In FIG. 8C, the second magnet centerline 872 is not in a skewed position in reference to Hall effect sensor centerline 870. In FIG. 8A second magnet centerline 872 and the Hall effect sensor centerline 870 are collinear.

In the example of FIG. 8C, the travel location of the second magnet centerline 872 corresponds to 5 mm as illustrated in FIGS. 12A-12G.

FIG. 8D illustrates an embodiment, which is an example of a skewed configuration of the second magnet 620. In this embodiment, the second magnet centerline 872 is in a skewed position in reference to the Hall effect sensor centerline 870. In FIG. 8D, the Hall effect sensor centerline 870 is skewed away from the second magnet centerline 872 and away from the magnet space centerline 910 (as well as away from the first magnet centerline 871).

In an embodiment, FIG. 8D can represent a skewed configuration which can set or maintain the power tool in sequential mode.

The reference centerline 910 can be set collinearly to the point precisely between the first magnet 610 and the second magnet 620. Zero point 900 represents a point which is collinear with second magnet centerline 872. Alternatively, the reference centerline 910 can be set at the location precisely between the first magnet centerline 871 and the second magnet centerline 872. In other embodiments, the reference centerline 910 can be set with a tolerance, or to account for differences in magnet size, flux strength or other factors. It can be convenient to set the reference centerline 910 to correspond to a zero crossing point where the flux density is zero in relation to a Hall effect sensor 600.

The skewing of orientations of the Hall effect sensor 600 and one or more magnets can be broadly applied to create a variety of operational and technical advantages.

In the embodiment illustrated in FIG. 8D, the switch can be designed such that the microprocessor 1040 will not change the mode from sequential mode to bump mode until the switch is thrown to a position such that the travel of the magnet is such that the Hall effect sensor is located one mm or greater beyond the second magnet centerline 872 of the second magnet 620 in a direction away from the zero crossing along the throw path. In an embodiment, the second magnet centerline 872 can be skewed 1 mm beyond the zero point 900 in a direction away from magnet space centerline 910.

In the example of FIG. 8D, the travel location of the second magnet centerline 872 corresponds to 6 mm as illustrated in FIGS. 12A-12G.

The skewed design is not limited to the arrangement of the examples herein. The mode selector switch can be configured such that other skewed dimensional relationships are used. The mode selector switch can be designed to use a skew of a distance which allows the Hall effect sensor output to indicate to the microprocessor 1040 a mode set by a mode selector switch to a reliable degree of tolerance, e.g. in a range of from about 0.05 mm to about 2 mm. In a non-limiting example, a throw can be skewed in any value of distance in a range of from less than 1 mm to greater than 10 mm from the centerline of a magnet used as a basis to switch modes, e.g. skews of 1 mm or less, 2 mm, 3 mm, 4 mm, 5 mm and 6 mm or greater can be used.

In an embodiment, the first 610 and the second 620 magnet can be placed adjacent to a piece of carbon steel. The carbon steel can be low carbon steel. Other types of steel and iron can also be used. The use of a piece of low carbon steel iron adjacent to the first magnet 610 and the second magnet 620 allows for the use of magnets of smaller size.

In an embodiment, a sensing distance is calculated normal to, i.e. perpendicular to, the plane of the face of the Hall effect sensor to the face of a magnetic source above. In another embodiment, the sensing distance can be measured at an angle other than normal, or can be determined based upon an X, Y, Z coordinate system. Thus, a three vector coordinate system to describe flux can be used. A three vector coordinate system is also used to reference throw and travel (see FIGS. 7 and 8-8D).

This disclosure is not intended be limited to one direction or one plane of relative movement between a magnetometer (e.g. Hall effect sensor) and a magnetic source. It is not intended to be limited as to a particular configuration between the magnetometer and a magnetic source. It is also not intended to be limited or as to how the relative movement between the magnetometer and a magnetic source to achieve travel or throw is obtained.

FIG. 9 is a detail view of the mounting of a mode selector switch slider. FIG. 9 illustrates the slider 400 mounted on the potting boat 500 having the inner rail 515 and the outer rail 520. The outer rail interface 416 of the slider 400 is slidably shown proximate to an outer rail surface 521 of the outer rail 515.

A "C" shaped interlock allows for excellent mechanical strength, good sliding characteristics, very small tolerance stack-up, and requires no additional fasteners. In the embodiment of FIG. 9, the "C"-interlock 450 is illustrated.

In an embodiment, the sensing distance 700 is the distance from the facing surface 605 of the Hall effect sensor 600 to the face of the closest magnetic source (e.g. the first magnet 610 or the second magnet 620).

The first magnet 610 and the back plate 630 are illustrated by hidden lines and are located in the slider 400 at a position to have an affect on the Hall effect sensor 600 attached to a circuit board 580. The sensing distance 700 is shown between a first magnet 610 and the facing surface 605 of the sensing element 608 of the Hall effect sensor 600.

In an embodiment, the sensing distance 700 can be measured from an inner magnet face 612 of the first magnet 610 to the sensing element 608 of the Hall effect sensor 600. In an embodiment, the sensing distance 700 can also be a sensing distance measured from the inner magnet face 613 of the second magnet 620 the sensing element 608 of the Hall effect sensor 600. In such embodiment, either of the first magnet 610 or the second magnet 620 can be reversibly positioned generally opposite of the Hall effect sensor 600 based upon the position of the slider 400.

The sensing distance 700 can also be measured from a magnetic source to the facing surface 605 of a sensing element 608 of the Hall effect sensor 600. Thus, in embodiments the sensing distance 700 can be measured from a desired portion of a magnetic source to a desired portion of the Hall effect sensor 600.

In the example of FIG. 9, the sensing distance 700 is measured from the inner magnet face 612 of the first magnet 610 to the facing surface 605 of the sensing element 608 of Hall effect sensor 600.

The motors of power tools and other sources can generate debris, filings and other materials which can accumulate between the potting 505 and the sliding interface 460. Such debris can create difficulties in mode selector switch operation. Debris can also arise from the work environment in which the tool is used, or elsewhere, and which can enter the power tool. As a non-limiting example, metallic, magnetic and insulating debris can result in inaccuracies in data regarding the position of a magnetic source as read by the Hall effect sensor 600.

The negative impact of this problem is solved by setting an accumulation depth 750 such that accumulation of undesired materials such as, in a non-limiting example, metallic and magnetic debris is controlled and limited to an amount less than a specified value. In an embodiment, the accumulation depth 750 has a value of distance which is less than 2.0 mm, thus preventing an accumulation of debris greater than 2.0 mm measured between a potting surface 506 and the sliding interface 460. In other embodiments, a shorter depth of the accumulation depth 750 can be used. In a non-limiting example, values for the accumulation depth 750 can be selected in a range from about 0.2 mm to less than about 20 mm. The accumulation depth 750 value can be selecting in a range from about 1 mm to about 6 mm. In an embodiment, the accumulation depth 750 of about 3.0 mm can be used. In other embodiments, it can be desirable to select the accumulation depth 750 at a value of 10 mm or less. This disclosure is not limited to a set value or range of the accumulation depth 750 and should be broadly construed in this regard.

In a non-limiting example, filings from a flywheel can accumulate across the space of the sensing distance and build up. In the disclosed, Hall effect sensor switch, such accumulation does not cause the Hall effect mode selector to switch modes. In an embodiment, the sensing distance between a Hall effect sensor and a magnet is established such that metal filings and other debris which can build up in the space of the sensing distance do not cause a switch in mode. Sensing distances that are effective in avoiding the influence of debris range from 0.1 mm to 8 mm. Sensing distances between 2 mm and 6 mm can be used. In an embodiment, a sensing distance greater than 10 mm can be used.

Figure 9A:
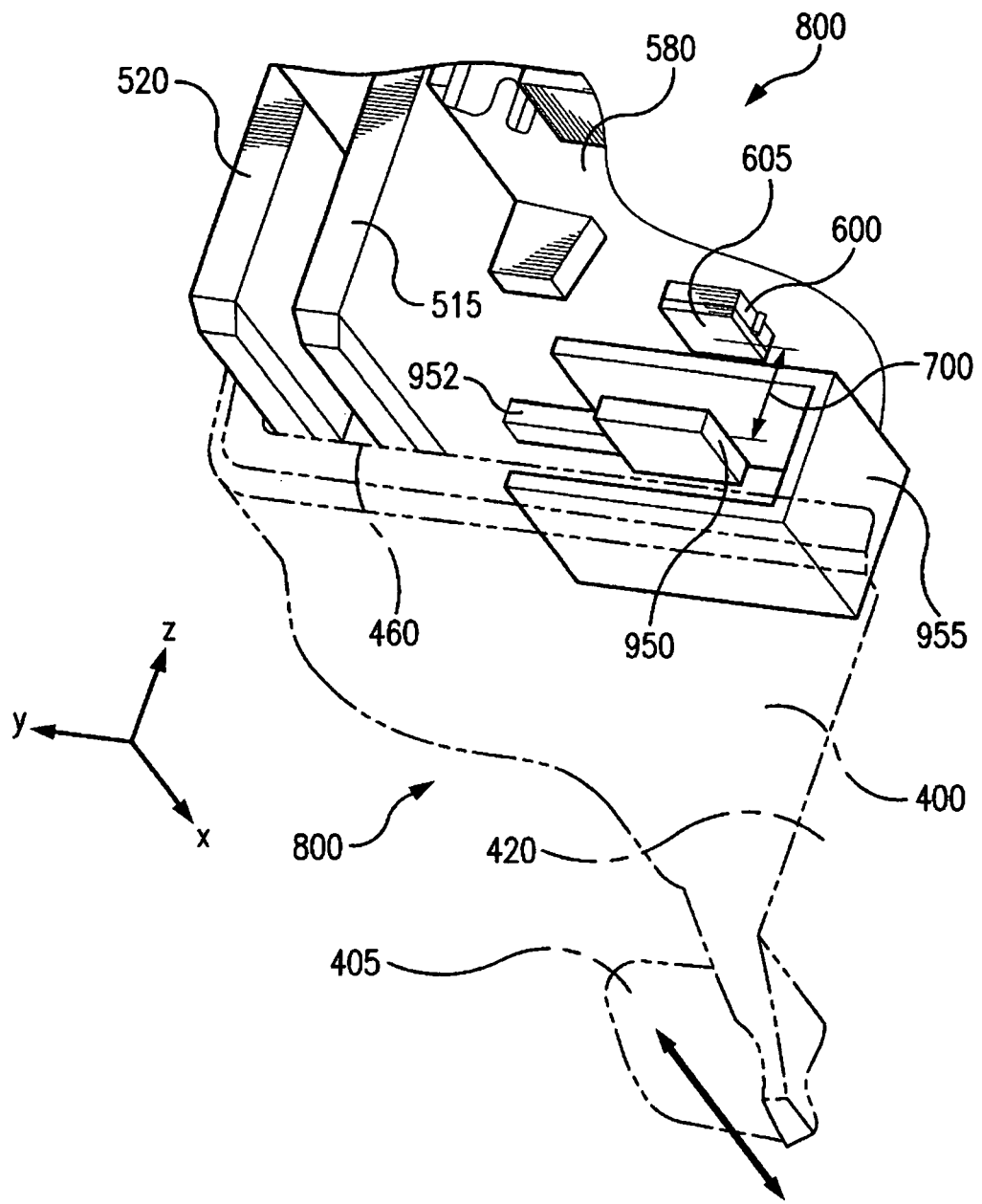
FIG. 9A is a detail view of a slidable mounting of a slider using a "C"-interlock and having a magnet shield.

FIG. 9A is a detail view of a slidable mounting of a mode selector switch slider using a "C"-interlock and having a magnet shield 955. In this example embodiment, a magnet 950 is located across from Hall effect sensor 600 by a magnet mounting 952. This disclosure is not limited regarding the nature or configuration of the magnet mounting. The magnet mounting in this example, mounts to a portion of the potting boat. The slider 400 has a magnet shield 955 which blocks at least a portion of the magnetic flux of a magnet 950 from affecting the Hall effect sensor 600. In this embodiment, the voltage output from the Hall effect sensor 600 is different between the state where the magnet shield blocks at least a portion of the magnetic flux of the magnet 950 from the Hall effect sensor 600 and when it does not.

The microprocessor 1040 can use changes in voltage output from the Hall effect sensor 600 to set, change or maintain a mode of operation. Changing the location of the magnet shield 955 can be used to switch the mode of operation of the tool.

In an embodiment, the magnet shield can be used to short the North and South fields of the magnet 950.

In this embodiment, when the magnet shield 955 is not shielding the Hall effect sensor 600, the magnet flux affecting the Hall effect sensor 600 can continuously be present at a value, or can be a generally constant flux. When the magnet shield 955 shorts the field, or otherwise changes the flux affecting the Hall effect sensor 600, the microprocessor 1040 can set, change or maintain a mode of operation. Like reference numbers in FIG. 9 identify like elements in FIG. 9A.

FIG. 10 is a detail view of a mounting of a mode selector switch slider having an index bolt 801. In an embodiment, the Hall effect mode selector switch assembly does not require screws, but can be assembled with a "C" interlock and sliding interface.

FIG. 10 depicts an embodiment having the index bolt 801 located, in part, in the index bolt channel 518. In an embodiment, the sliding interface 460 has a portion which is an index bolt interface 462. The index bolt interface 462 is formed to interface with the index bolt 801 to result in an indexing action of the slider 400 when the slider is slid along the slider rail 510.

A variety of index bolts can be used. In an embodiment, as illustrated in FIG. 10, the index bolt 801 can have a bullet shape with an indexing bolt tip 802. An index bolt spring 805 can be present inside at least a part of the index bolt 801 and optionally can be in contact with the slider rail 510. Optionally, the index bolt spring 805 can have an embedded spring portion 810 which is embedded in a portion of the slider rail 510. The index bolt 801 can be used to control the movement of the slider 400 and the switching of modes by the operator by use of the Hall effect mode selection switch.

In another embodiment, an index bolt spring 805 is not embedded. The index bolt spring 805 can be configured to bias the index bolt 801 in a variety of means. In one embodiment, the index bolt spring 805 is mechanically affixed to within the index bolt channel 518 and has at least a portion placed within the index bolt 801. In yet another embodiment, a guiding rod is inserted within the index bolt spring 805. If such rod (or post) is used, projections from the rod, e.g. crush ribs, retention ribs and/or petals, can be used to secure a portion of the index bolt spring 805 and maintain the index bolt spring 805 in a configuration to bias the index bolt 801. Such a rod can be mechanically affixed to a portion of the slider rail 510 and/or the index bolt channel 518. In another embodiment, such a rod can have a portion embedded in a portion of the slider rail 510. In yet another embodiment, the index bolt spring 805 and the index bolt 801 are maintained within the index bolt channel 518 and biased against the index bolt interface 462 by the bias of the index bolt spring 805 and/or frictional contact of the spring to at least a portion of the channel, the spring and the index bolt 801 and the index bolt tip 802 and the index bolt interface 462.

The movement of the index bolt 801 can be guided by the index bolt channel 518 and the biasing of the index bolt 801 by the index bolt spring 805 toward the index bolt interface 462. In an embodiment, the index bolt spring 805 biases an index bolt tip 802 against the index bolt interface 462.

The index bolt interface 462 can have an indexing interface 840 which has a first notched surface 855 and a second notched surface 858. The first notched surface 855 and the second notched surface 858 can be connected by an indexing transition bump 857.

In an example, the indexing tip 802 of the indexing bolt 801 can be pressed against the first notched surface 855 by the bias of the index bolt spring 805 toward the index bolt interface 462.

In an example, the slider can be reversibly indexed from a position in which the index bolt 801 is engaged with the first notched surface 855 to a position in which the index bolt 801 is engaged with a second notched surface 858. Reversible indexing can be achieved by the operator moving the slider 400 along a distance of the slider rail 510. Moving the slider 400 can result in a portion of the first notched surface 855 being moved away from the index bolt tip 802 and an indexing transition bump 857 being brought into contact with the index bolt tip 802 compressing the index bolt spring 805, after which the indexing transition bump 857 is moved away from index bolt tip 802 and a second notched surface 858 is brought into contact with the index bolt tip 802 which is pressed against the second notched surface 858 by the bias of the index bolt spring 805.

The indexing of this embodiment is a reversible action. The movement of the slider 400 can be executed to index the slider from a position in which the index bolt 801 is engaged with the second notched surface 858 to a position in which the index bolt 801 is engaged with a first notched surface 855. Reversible indexing can be achieved by moving the slider 400 along a distance of the slider rail 510. Moving the slider 400 results in a portion of the second notched surface 858 being moved away from the index bolt tip 802 and the indexing transition bump 857 being brought into contact with the index bolt tip 802 compressing the index bolt spring 805, after which the indexing transition bump 857 is moved away from the index bolt tip 802 and the first notched surface 855 is brought into contact with the index bolt tip 802 which is pressed against the first notched surface 855 by the bias of the index bolt spring 805.

In yet other embodiments, movement of one or more magnets or one or more magnetoresistive components, magnetometers, sensors, Hall effect sensors, can be achieved by means including but not limited to, sliders, rotating members, indexes or indexing means. Components which can affect a magnetoresistor can be moved toward or away from a magnetoresistor by a variety of means. For example, one or more magnets can be moved toward or away from a magnetoresistor, e.g. Hall effect sensor. In an example, a Hall effect sensor 600 and a magnet can have a sensing distance 700 between them. The sensing distance can change, which can change the output voltage of the Hall effect sensor 600. A change in the output voltage of the Hall effect sensor 600 can be used to set, change or maintain a mode of operation of the tool.

The indexing of the movement of the slider 400 can include a number of indexing positions. FIG. 10 illustrates, in an index position, the index bolt is engaged with the first notched surface 855; and in another index position, the index bolt 801 is engaged with a second notched surface 858. In an embodiment, an index position can set the mode to sequential mode and another index position can set the mode to bump mode. In one example, when the index bolt 801 is engaged with the first notched surface 855, the mode can be set to a sequential mode; and when the index bolt 801 is engaged with the second notched surface 858, the mode can be set to a bump mode.

In yet other embodiments, a number of index positions can be used to indicate other modes. In a non-limiting example, an index position can indicate a standby mode, another indexing position can indicate a lock mode and yet another index position can indicate the operator protection mode (e.g. to prevent driving of a fastener and/or motor operation, powering off, or other fault handling). In an embodiment, the index bolt can be an injector pin that engages a gate location.

In an embodiment, an index bolt which is recessed in a pocket which is molded on the potting boat can be used to set the detent positions as it moves against a curved surface on the slider 400.

In one embodiment an index bolt can be used to facilitate switching of the Hall effect mode selector switch. In an embodiment, the index bolt can be mounted in a box and movement of the switch indexes the bolt from one position (e.g. notch or hole) to another.

In an embodiment, the Hall effect mode selector is designed with specifications such that the tool can be dropped and the switch does not change position such that the mode of the tool which existed prior to the drop is changed. In one embodiment a fastening tool can be dropped from a height of 40 feet and upon impact with a landing surface, the Hall effect mode selector does not change position.

FIG. 11 illustrates a circuit diagram of a mode selection circuit having a Hall effect sensor.

In FIG. 11 a voltage source 1000 can provide positive supply voltage (Vcc) through a line 1010 to a linear Hall effect sensor 1020. The linear Hall effect sensor 1020 can provide an output signal 1030 to a resistor 1032. The output signal 1030 in one embodiment can range from 0 V to 3.3 V. The linear Hall effect sensor 1020 can be grounded through a line 1040 to a ground 1004. A capacitor 1002 can be used for filtering in conjunction with the resistor 1032. The resistor 1032 can be present in the line 1033 between 1030 and 1034 and can filter noise which can arise between the Hall effect sensor 1020 and a microprocessor input 1034. The microprocessor 1040 can receive an analog signal (voltage) and by an analog digital converter converts that signal into digital information for processing by a machine readable code executed by the microprocessor. In an embodiment, the microprocessor 1040 receives the output voltage from the linear Hall effect sensor 1020. Optionally, the output voltage from the linear Hall effect sensor 1020 can be modified prior to reaching the microprocessor 1040 (e.g. noise reduction, amplification or other signal modification or other signal processing). FIG. 11 illustrates the mode selector signal as the line 1033. Optionally, in an embodiment, a capacitor can be used in conjunction with the mode selector signal and grounded.

In an embodiment, the microprocessor 1040 can monitor the status of a first switch 1050 (e.g. upper contact trip 310 or lower contact trip 320) and a second switch 1060 (e.g. trigger 305). The microprocessor 1040 can determine the active mode based upon the status of a first switch 1050 and a second switch 1060.

In an embodiment, the microprocessor 1040 determines the mode of the nailer 1 based upon the status of the upper contact trip 310 and/or lower contact trip 320 and well as the trigger 305 switch. In an embodiment, the microprocessor is a digital processor.

Based upon the mode selector signal 1033 received by the microprocessor 1040 at the microprocessor input 1034, the microprocessor will operate in an indicated mode. In an embodiment, if the mode selector signal 1033 indicates a voltage output of between 0 V and 1.8 V the microprocessor 1040 will operate in sequential mode. If a mode select signal 1033 indicates a voltage of greater than 1.8 V and less than or equal to 3.0 V then the microprocessor 1040 will operate in bump mode. If the mode selector signal 1033 indicates a voltage of greater than 3.0 V then the microprocessor 1040 will operate in sequential mode. In an embodiment, a mode selector signal 1033, which is not indicating a voltage of greater than 1.8 V and less than or equal to 3.0 V, will result in the microprocessor 1040 setting or maintaining the operating mode in sequential mode without regard to whether the slider has been moved.

The linear Hall effect sensor output is used by the microprocessor 1040 to determine the magnet position. In an embodiment, the Hall effect sensor output is an analog signal which is fed to an analog to digital converter of a microprocessor. In another embodiment, the Hall effect sensor provides a digital output signal.

The microprocessor 1040 can send a signal 1045 to motor 1070 controlling its operation and action, e.g whether to turn or not turn, as well as one or more characteristics of such action, e.g. speed of rotation, power, torque, direction, energy usage, duration, and other characteristics.

FIG. 12A is a chart of operational characteristics of example bump and sequential ranges. Relationships between output voltages ranging from 0.0 to 5.0 and magnetic flux densities of negative 75 to positive 75 are shown. In an embodiment, bump mode is engaged over a range of 5 mT to 55 mT at voltages ranging from 1.7 V to 2.8 V.

In an embodiment, having a Vcc equal 3 V bump mode is engaged between 5 mT at 1.7 V through 55 mT at 2.8 V. Sequential mode is engaged at any point outside of the bump mode range. Thus, 4 Vcc equals 3 V sequential mode is found from a negative 60 mT at 0.0 V through less than 5 mT at less than 1.7 V, as well as from greater than 55 mT at greater than 2.7 V.

In an embodiment, the Vcc vs. mT curve has a portion with a slope m of 40 mV/mT, e.g. m=40 mV/mT. In another embodiment the Vcc vs. mT curve has a portion with a slope m of 6 mV/mT, e.g. m=6 mV/mT. The mV/mT curve slope can be chosen to match a desired performance of a mode switching specification.

The tolerance of the operation of a mode selector switch can be chosen and the operational characteristics of the switch set in relation to the chosen tolerance. In an embodiment, Vcc−Tolerance=Vcc/2+Tolerance. The relationship Vcc/2 can be another value, e.g. Vcc/n where n is a value other than 2.

The full range (0V to Vcc) can be broken up into multiple segments (n). The segments can be equal or unequal. In the example embodiment of FIGS. 12-12G, the range can be divided into three (3) segments. In this example embodiment, the microprocessor 1040 can interpret the output of the Hall effect sensor for two of the three segments as indicating a sequential mode and one as indicating a bump mode.

This disclosure is not to be limited regarding the number of possible modes, or the number of segments. The number of segments that are identifiable by the microprocessor 1040 can be determined as a function of the number of magnetic regions used. One magnetic region can be distinguished from another by polarity and/or intensity (of magnetic field and/or of polarity). In the example embodiment of FIGS. 12-12G two magnetic regions are used (i.e. 1 N region and 1 S region). In the example embodiment of FIGS. 12-12G one sensor is used (i.e. Hall effect sensor 600). The use of a number of sensors can identify a number of regions. Thus, a large number of modes can be achieved by using a number of magnetic regions and/or a number of sensors.

In another example, the data provided in FIG. 12G can identify five (5) regions, i.e.: one (1) region corresponding to N flux density; two (2) regions corresponding to S flux density, three (3) regions corresponding to between, and N flux, and S flux.

In additional embodiments, the general formula:

number of segments=(number of magnetic zones+1)+2(regions above or below);

can be used to determine regions corresponding to mode assignments for sensor(s). The formula can be modified to account for any effects which found from the existence of multiple magnetic regions and/or multiple sensors; as well as to account for distances between magnets and sensors.

In yet another example embodiment, a 3 speed transmission gear select drill can have a travel from 0 to 0.83 (X/Z). Speed 1 can be values greater than 1.95 (Vcc+tolerance) (position j), Speed 2 can be values 1.35V to 1.95V (position 0.417) (Vcc/2+/−Tolerance) and Speed 3 can be assigned to values than 1.35V (−Vcc/2−Tolerance).

The values disclosed herein for an engaged bump mode operation are non-limiting examples. The disclosure is not limited to voltage, such as positive supply voltage, or magnetic flux density. These characteristics will be chosen and will depend upon the type of Hall effect sensor and magnets used.

In an embodiment, surface flux density is measured originating at the center of a North and/or South face of a magnet.

Examples 1, 2 and 3

FIG. 12A is a graph of three example embodiments of Mode of Operation Characteristics of a power tool.

In FIG. 12A, one of these three examples uses a Hall effect sensor which is a linear Hall effect sensor and is an AKM linear Hall effect sensor model EQ432L operating at a value in a range of 3.0 V through 3.3 V. An example of operation at 3 V, can be represented by the line Vcc=3 V of FIG. 12A.

In an example embodiment, a rare earth magnet can be used. In an embodiment, one or more N35 and/or N35SH magnets can be used. Magnets different from these can be used (e.g. neodymium iron boron magnets).

In an embodiment, the magnet can be a Grade N35H Neodymium—boron magnet. In another embodiment, the magnet can be a Grade N35SH Neodymium—boron magnet. In another embodiment, the magnet can be a Grade 62H Neodymium magnet. In another embodiment, the magnet can be a samarium—cobalt magnet.

In an embodiment, a magnet can be used which exhibits a magnetic flux sufficient to allow a Hall effect sensor to be used in a mode selector switch having a sensing distance 700 of 6 mm. In an embodiment, a magnet having a magnetic flux of 1200 mT can be used with a Hall effect sensor and a sensing distance 700 of 6 mm.

In yet other embodiments, ferrite magnets can be used which have a magnetic flux of 400 mT or greater.

A magnet can be used which has a flux that can affect a Hall effect sensor. The flux can be greater than background or interfering magnetic forces (originating with the tool itself or elsewhere). For example, fluxes of 3 mT-50 mT can be differentiated for background or interfering magnetic forces and can affect an output of a Hall effect sensor. Thus, low level flux differences e.g. 3 mT, 4 mT, 10 mT, 12 mT, 17 mT, 30 mT, 60 mT, 125 mT, or higher can be sufficient to cause a change in Hall effect sensor output that can be detected by a microprocessor and used in mode selection. Generally the stronger the magnetic flux, the smaller the magnet can be.

For these examples, the change in magnetic flux density can be between −60 mT and +60 mT.

The first example, is illustrated in FIG. 12A by the Vcc=3 V line for which the power tool will operate in bump mode when the Hall effect sensor produces an output voltage in a range from about 1.65 V to about 2.80 V. When the Vcc=3

V, bump logic will be used when the output voltage is in the bump logic zone. At Vcc=3 V, output voltages between about 1.65 V to about 2.80 V, resulted at magnetic flux density values in a range of about 5 mT through about 55 mT. Output voltage values below about 1.65 V and above about 2.80 V will result in sequential logic being used. An output voltage value below about 1.65 V will be in the sequential logic low zone and result in sequential logic being used. An output voltage value above about 2.80 V will be in the sequential logic high zone and result in sequential logic being used. In another embodiment at Vcc=3 V, the bump logic zone is in a range of output voltage values from about 1.7 V through 2.8 V.

The second example is illustrated in FIG. 12A by the Vcc=4 V line for which the power tool will operate in bump mode when the Hall effect sensor produces an output voltage in a range from about 1.65 V to about 2.80 V. When the Vcc=4 V, bump logic will be used when the output voltage is in the bump logic zone. At Vcc=4 V, output voltages between about 1.65 V to about 2.80 V, resulted at magnetic flux density values in a range of about −5 mT through about 25 mT. Output voltage values below about 1.65 V and above about 2.80 V will result sequential logic being used. An output voltage value below about 1.65 V will be in the sequential logic low zone and result in sequential logic being used. An output voltage value above about 2.80 V will be in the sequential logic high zone and result in sequential logic being used. In another embodiment at Vcc=4 V, the bump logic zone is in a range of output voltage values from about 1.7 V through 2.8 V.

The third example is illustrated in FIG. 12A by the Vcc=5 V line for which the power tool will operate in bump mode when the Hall effect sensor produces an output voltage in a range from about 1.65 V to about 2.80 V. When the Vcc=5 V, bump logic will be used when the output voltage is in the bump logic zone. At Vcc=5 V, output voltages between about 1.65 V to about 2.80 V, resulted at magnetic flux density values in a range of about −20 mT through about 5 mT. Output voltage values below about 1.65 V and above about 2.80 V will result sequential logic being used. An output voltage value below about 1.65 V will be in the sequential logic low zone and result in sequential logic being used. An output voltage value above about 2.80 V will be in the sequential logic high zone and result in sequential logic being used. In another embodiment at Vcc=5 V, the bump logic zone is in a range of output voltage values from about 1.7 V through 2.8 V.

The Hall effect mode selector can operate using a range of voltage and current. In one embodiment a supply voltage of 3.3 V is provided.

In an embodiment, a Hall effect sensor is used which exhibits a range of output under a 3.3 V electrical potential of negative 60 mT to positive 60 mT. In an embodiment, the zero crossing (i.e. zero mT) can occur at 1.65 V. In an embodiment, negative 60 mT is achieved at below 0.3 V.

In an embodiment, two magnets of opposite polarity adjacent to one another can provide a transition in polarity in between the magnet centers as they are moved across the Hall effect sensor.

In an embodiment, a zero crossing (i.e. zero mT) occurs at 1.65 V and the tool is switched from sequential into bump mode at a point greater than 47.5 mT. The switch can occur at a max voltage of 1.8 V to 2.7 V. In another embodiment, bump mode is entered at a value of 60 mT or greater under a voltage of 2.7 V or greater.

The operational characteristics and mode selector criteria can be set to a variety of values. Additionally, a variety of mode selector criteria can be used. The mode selector criteria can be set such that variances in power supply, device design and electromagnetic interferences do not cause the mode to be switched from sequential mode to bump mode.

Example 4

Figure 12B:
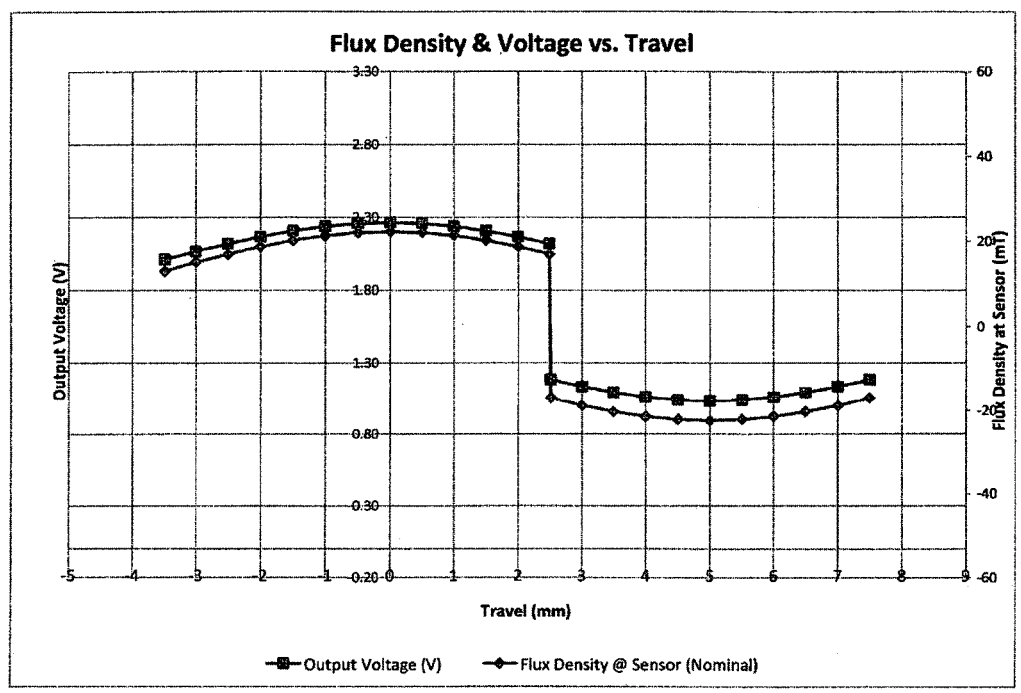
FIG. 12B is a graph of an embodiment of Flux Density and Voltage vs. Travel.

FIG. 12B is a graph of an example embodiment of Flux Density and Voltage vs. Travel. In this Embodiment, Vcc=3.3 V.

In an embodiment, a slider has a magnet which experiences a travel. FIG. 12B illustrates data regarding flux density experienced by a Hall effect sensor (nominal) compared to an output voltage of the Hall effect sensor over a travel of a magnet.

In an example, a slider was used which was adapted to have a throw which resulted in a travel of an attached magnet was used. In an embodiment, the travel of the magnet was in a range from stationary (i.e., zero travel) to 6 mm±a tolerance. In an embodiment, the tolerance was 0.1 mm. In other embodiments, the tolerance value can be a value in a range of from 0.05 mm through 2.0 mm (e.g. 0.05 mm, 1.0 mm and 1.5 mm), or larger. This disclosure is not intended to be limited by a length of throw, or length of a travel, or value of tolerance. A broad variety of tools can use the switch disclosed herein and lengths of throw, travel and tolerances can be of any value for a given type, model or particular tool employing a switch as disclosed herein. For various power tools a travel can be provided without a throw of a slider.

In this example embodiment, the slider 400 can have a first magnet 610 and a second magnet 620. Using a slider having the first magnet 610 and the second magnet 620, the 0 mm travel value can correspond to the first magnet 610 positioned as illustrated in FIG. 8A. In this embodiment, the first magnet 610 and the second magnet 620 can be located adjacent to one another on a slider and both move the same length of travel when the slider is moved (see FIG. 8A-FIG. 8D).

The slider can be thrown in a direction moving the second magnet 620 closer to the sensor in the direction of the arrows illustrated in FIG. 8B. As the slider moves and the travel increases, the output voltage of the Hall effect sensor 600 decreases. When the Hall effect sensor 600 is at a position in which the Hall effect sensor centerline 870 is between the first magnet 610 and the second magnet 620 as shown in FIG. 8B the magnetic flux affect on the Hall effect sensor 600 will change from a magnetic North of the first magnet 610 to a magnetic South of the second magnet 620. While travel continues to increase in value, the output voltage will, by step change, decrease in value as the South pole influence of second magnet 620 affects the Hall effect sensor 600. As the value of travel in FIG. 12B increases beyond the discontinuous point where polarity affecting the Hall effect sensor 600 changes from North to South at about 2.50 mm, the value of output voltage will continue to decline to a minimum value of about 1.04 V. FIG. 8C illustrates the second magnet at a travel of about 5.0 mm and an output voltage of 1.04 V.

In this example embodiment, the switch is skewed such that a travel of 6 mm places the second magnet 620 at a location as shown in FIG. 8D, which corresponds to an output voltage of about 1.06.

The switch can also be moved in a direction to reverse the above sequence of Example 4 which reduces the value of travel and in which the value of travel decreases. In this reverse sequence, second magnet 620 moves away form the Hall effect sensor 600 and first magnet 610 is positioned proximate to Hall effect sensor 600. In this example, the figures can be viewed in a reverse sequence from FIG. 8D to FIG. 8A.

In an embodiment, at Vcc=3.3 V, an upper bump range can be set at 2.8V and a lower bump range can be set at 1.9 V.

In the example embodiment illustrated in FIG. 12B, the maximum North (N) and South (S) magnetic pole separation is shown to be a nominal distance, shown as travel, of 5 mm. In this example, the nominal travel distance for sequential mode operation can be set at 6 mm. A wide range of separation values of distance between N and S poles facing the magnetoresistor of magnetic sources can be used. In another example, the poles could be reversed, or could be the same. In embodiments with multiple magnets, the poles of a number of magnets could be arrange in a variety of N and S configurations, and at a number of distances from a magnetoresistor (e.g. Hall effect sensor). A wide range of values of distance between magnets can be used.

In an example, the most N magnetic flux value of the first magnet 610 could face a Hall effect sensor 600 and the first magnet centerline 871 of the first magnet 610 can coincide with the Hall effect sensor centerline 870 of the Hall effect sensor 600. This configuration can be used as a nominal zero mm travel and can be used as a nominal location for causing, setting or maintaining bump mode operation.

In such example, the most S magnetic flux value of the second magnet 620 could face a Hall effect sensor 600 and the second magnet centerline 872 of the second magnet 620 can coincide with the Hall effect sensor centerline 870 of the Hall effect sensor 600. This configuration can occur when the first magnet centerline 871 is at a travel of 5 mm.

In an example of a skewed embodiment, the first magnet centerline 871 can be at a travel of 6 mm.

Figure 12C:
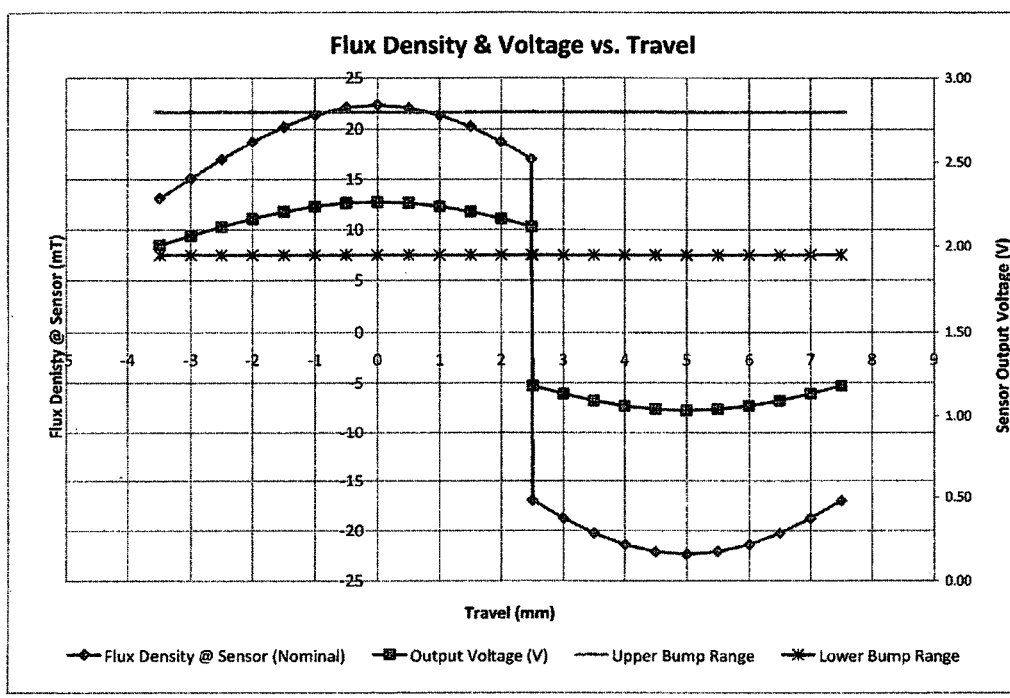
FIG. 12C is a graph of an embodiment of Flux Density and Voltage vs. Travel which is marked with an upper bump range and a lower bump range.

FIG. 12C is a graph of an embodiment of Flux Density and Voltage vs. Travel which illustrates an upper bump range and a lower bump range. If the flux density at the Hall effect sensor 600 and/or sensor output voltage has a value that is less than that of the lower bump range or greater than the upper bump range, then bump logic will not operate and bump operation will not occur.

Figure 12D:
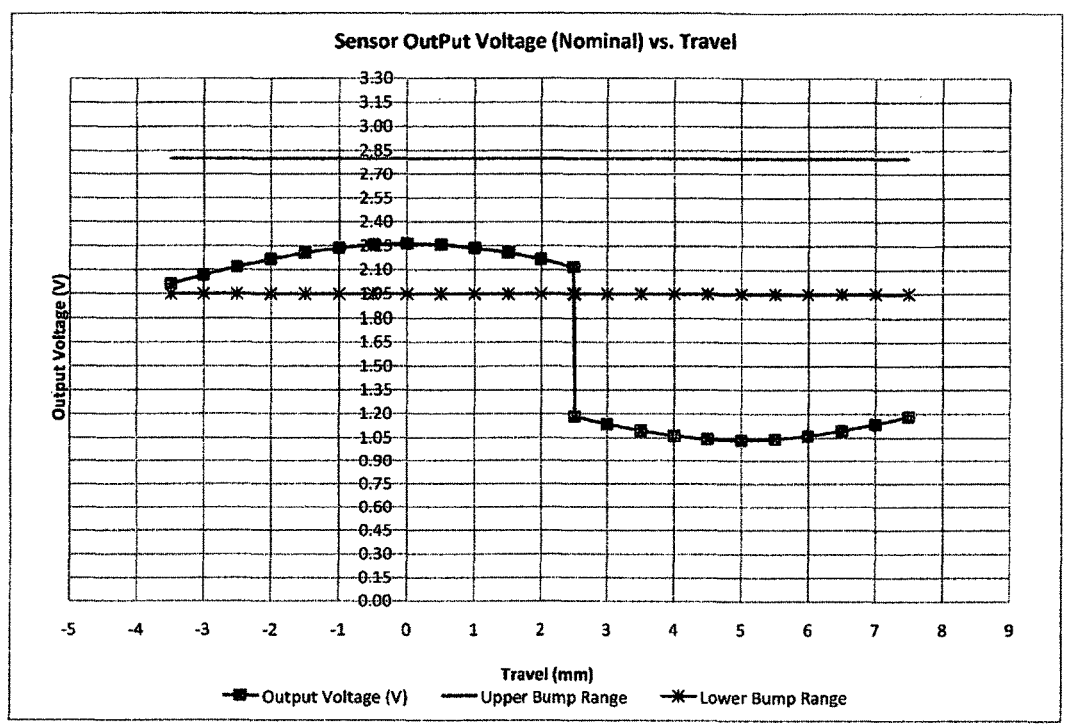
FIG. 12D is a graph of an embodiment of Sensor Output Voltage (Nominal) v. Travel.

FIG. 12D is a graph of an embodiment of Sensor Output Voltage (nominal) v. Travel that illustrates the movement or throw of the slider along a travel from a sequential mode position (e.g. 2.51 mm through 7.5 mm values of Table 1 entitled Data Regarding Normalized Travel of FIG. 12G) to bump mode (e.g. 2.49 mm through −3.5 mm values of Table 1 of FIG. 12G). In an embodiment, bump logic will not operate if the travel of the slider is greater than a value of 2 mm (e.g. FIGS. 8B-D).

Figure 12E:
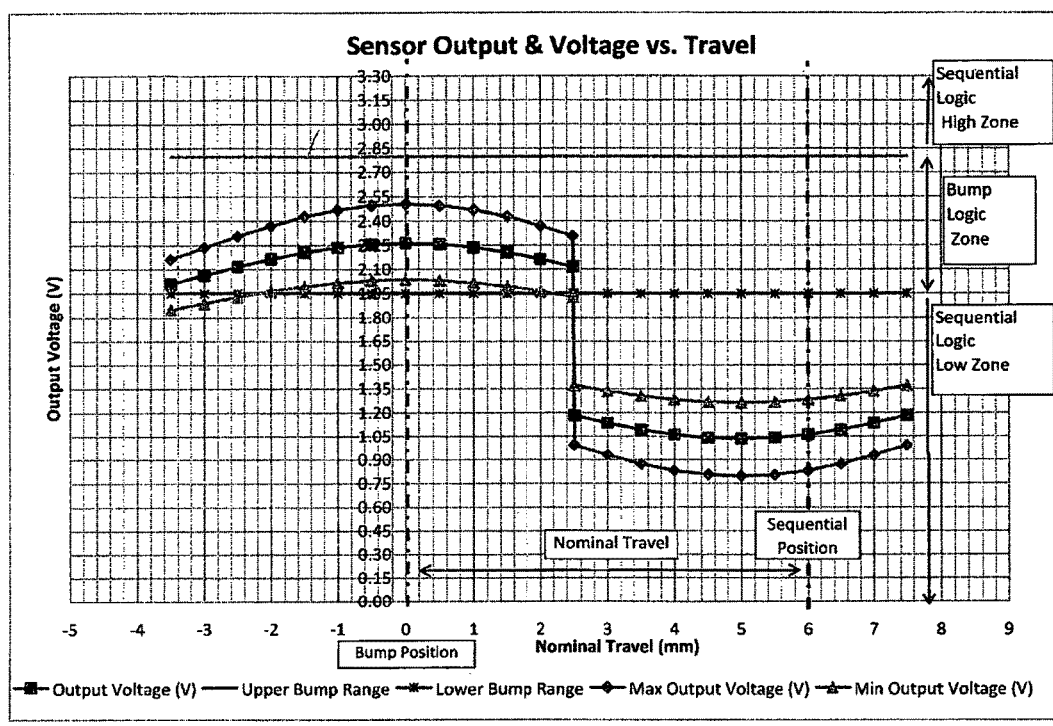
FIG. 12E is a graph of an embodiment of Sensor Output and Voltage vs. Travel, also indicating max output voltage data and min output voltage data.

FIG. 12E is a graph of an embodiment of Sensor Output and Voltage vs. Travel, also indicating Maximum Output Voltage data and Minimum Output Voltage data.

FIG. 12E illustrates that at Vcc=3.3 V, an upper bump range can be set at 2.8 V and a lower bump range can be set at 1.9 V. FIG. 12E further illustrates that the mode of operation can be set for bump logic within a bump logic zone which encompasses values of output voltage from 2.26 V through 1.95 V. Values of output voltage and travel not encompassed by this range will cause sequential logic to be executed.

In the example embodiment of FIG. 12E, the output voltage range is shown in conjunction with a range of travel such that the combined ranged and travel setting can be 2.26 V at 0 mm travel through 1.95 V at 2.49 mm travel. Values of output voltage and/or travel not encompassed by this range will cause sequential logic to be executed.

Example 5

Figure 12F:
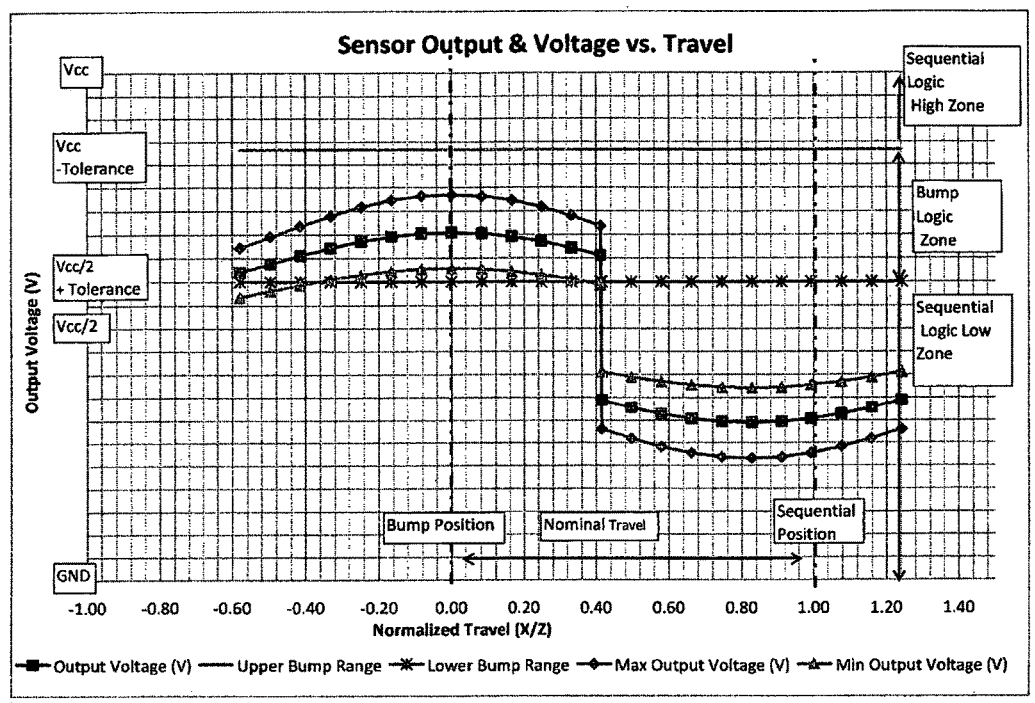
FIG. 12F is a graph illustrating a generalized relationship of Sensor Output and Voltage vs. Travel.

FIG. 12F is a graph of a generalized relationship of Sensor Output and Voltage vs. Travel that illustrates an example of a sensor output and output voltage and a normalized travel of between 0.00 and 1.00. In this example, the switch will be at a bump mode position setting when the knob is located in the 0.00 normalized travel position. The switch will be in a sequential mode setting when the knob is located at a 1.00 normalized travel position. The relationships set forth in this example are unitless and can be broadly applied to numerous embodiments of mode switch mechanisms having magnetometers, e.g. Hall effect scan sensor.

For this example in which a Vcc is applied to a Hall effect sensor, an upper bump range can be set at Vcc-Tolerance and a lower bump range can be set at Vcc/2±Tolerance. FIG. 12F further illustrates that the mode of operation can be set for bump logic within a bump logic zone which encompasses values of output voltage greater than Vcc/2±Tolerance. Values of output voltage and travel not encompassed by this range will cause sequential logic to be executed.

In the example of FIG. 12F, the output voltage range is shown in conjunction with a range of nominal travel such that the combined ranged and travel setting can be an output voltage greater than Vcc/2±Tolerance over a range of nominal travel from 0.0 to 0.39. Values of output voltage and/or travel not encompassed by this range will cause sequential logic to be executed.

In this example (see FIGS. 8-8D), the first magnet 610 of the slider has its North pole facing the Hall effect sensor 600. The second magnet 620 of the slider has its South pole facing the Hall effect sensor 600. In an embodiment, the magnet 610 has a first position across from (proximate to) the Hall effect sensor 600 to result in the voltage output indicated at a travel value of 7.5 mm. The slider is moved such that the first magnet 610 passes over the Hall effect sensor 600 and the second magnet 620 moves toward the Hall effect sensor 600. As the first magnet centerline 871 of the first magnet 610 coincides with the Hall effect sensor centerline 870 of the Hall effect sensor 600, the output voltage reaches a minimum value of 1.00 (e.g. FIG. 8A). As the slider 400 continues to move along its travel, at a travel of 2 mm the Hall effect sensor 600 is located between the first magnet 610 and the second magnet 620, at which point the flux density is zero (e.g. FIG. 8B). As the second magnet 620 moves across from the Hall effect sensor 600 and the first magnet 610 moves away from the Hall effect sensor 600, the flux density can rise to a maximum value of 22.35 with a voltage of 2.26 at a travel of zero mm (e.g. FIG. 8C) where the second magnet centerline 872 of the second magnet 620 coincides with the Hall effect sensor centerline 870 of Hall effect sensor 600. As the slider moves to a travel value of −3.5 mm the output voltage reduces to 2.01 V.

FIG. 12G is a data set of an embodiment which supports the graphs of FIGS. 12B-12F. FIG. 12G has a data point of 0.83. In an embodiment, a value of 0.83 (X/Z) can corresponds to a non-dimensional travel at which a magnet's flux density is the most S.

Example 6

Figure 13:
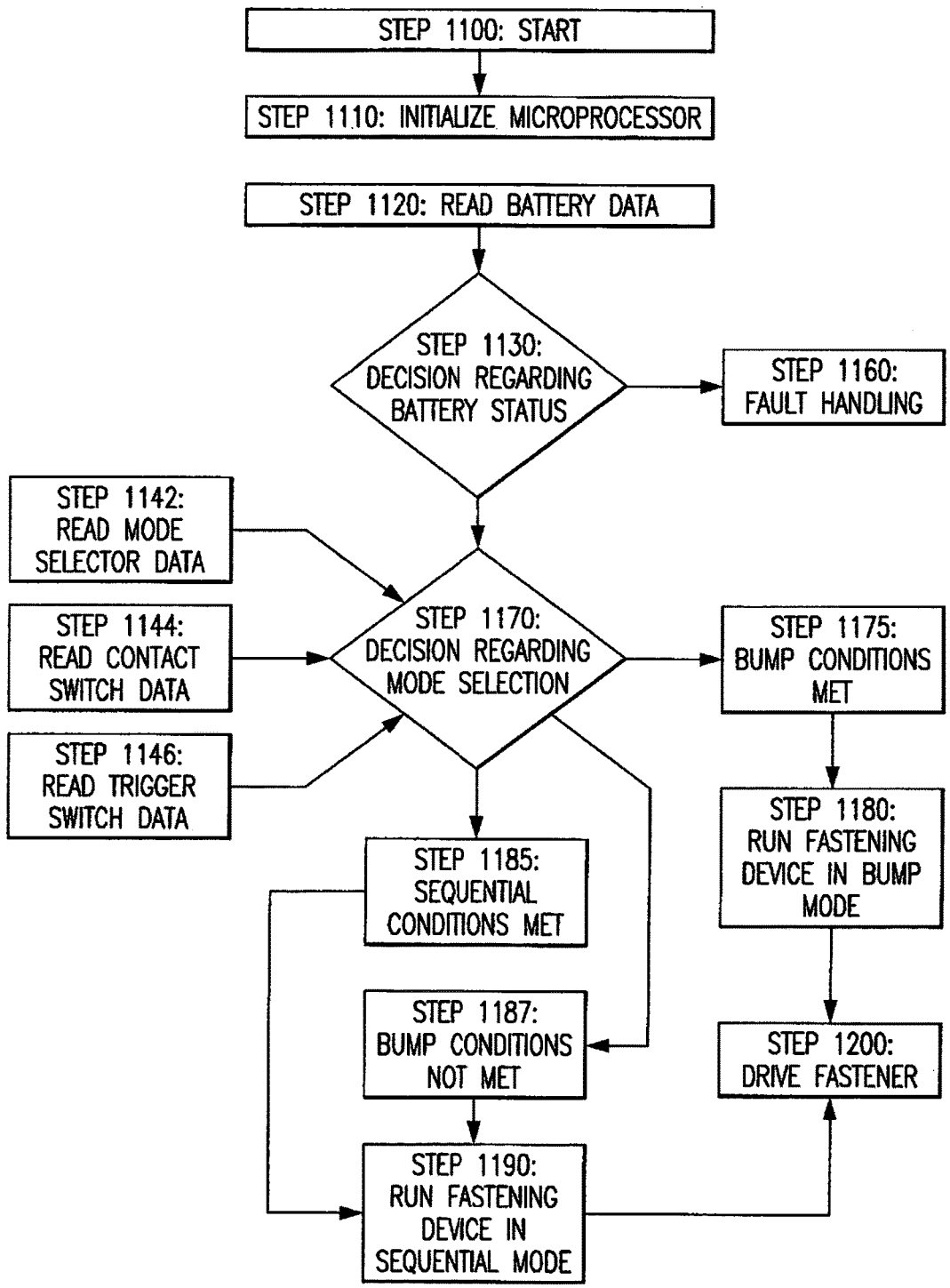
FIG. 13 is a logic diagram for an embodiment of a mode selector.

FIG. 13 is a logic diagram for an embodiment of mode selector having logic steps which result in the power tool operating in either a sequential mode or a bump mode. In this embodiment, the power tool is a fastening tool, and can be a nailer, e.g. the nailer 1. The logic diagram includes steps beginning with Step 1100: Start through Step 1200: Drive Fastener. In an embodiment, the fastener driven is a nail.

Step 1100: Start. In Step 1100 the operator acts to start the power tool, such as by pressing a start button, activating a start trigger, activating a sensor designating a start action or other means of causing the power tool to start. Alternatively, the power tool function in a sleep or power saving state. A start can also be a transition from such a sleep or power saving state to a fully active state.

Step 1110: Initialize Microprocessor. In Step 1110 a microprocessor is initialized. In a embodiment a microprocessor monitors the status and functioning of the power tool and determines the operating mode of the tool. After starting, the microprocessor 1040 is initialized and can process data regarding the power tool. The microprocessor 1040 can draw power when the power tool is in an off, sleep or power saving mode. When having power, the microprocessor 1040 can remain active and does not require initialization after a start is executed.

Step 1120: Read Battery Data. In Step 1120 a battery data is read. After the microprocessor 1040 is initialized, data regarding battery status can be processed by the microprocessor 1040. This data regarding battery status can be one or more of, but not limited to: voltage; terminal voltage; nominal voltage; cut-off voltage; open circuit voltage; charge voltage; float voltage; current; discharge current; maximum continuous discharge current; charge current; C-rate; capacity or nominal capacity; maximum discharge pulse current; maximum internal resistance; internal resistance; energy density; specific energy or gravimetric energy density; specific power; power density; temperature; capacitance; E-rate (discharge power to discharge battery in 1 hour), Energy or nominal energy or energy capacity (watt-hour available at a discharge current); state of charge (%; battery capacity as an expression of maximum battery capacity), depth of discharge (%; battery capacity which has been discharged as a expression of maximum capacity), cycle life (e.g. number of discharge-charge cycles available before it fails). This disclosure regarding battery data which can be read, interpreted or calculated by the microprocessor 1040 is not intended to be limiting and should be broadly interpreted in this regard.

Step 1130: Decision Regarding Battery Status. In Step 1130 a decision is made regarding the battery status. The microprocessor 1040 can compare a battery data value to a specification. If the battery data is considered to be within acceptable range, then the microprocessor 1040 will not designate a battery fault. If the battery data is not within specification, then the microprocessor 1040 will indicate a fault and proceed to initiate Step 1160: Fault Handling (see infra).

Step 1142: Read Mode Selector Data. In Step 1142 mode selector data is read. In an embodiment, a mode selector switch can be set by the operator at a sequential or a bump setting. The microprocessor 1040 can read a data indicating whether the operator set the mode selector at either a sequential or a bump setting. The setting data for the mode selector switch can be provided to the microprocessor 1040 by a variety of means. In an embodiment, a Hall effect sensor can be used to identify the position of the mode selector switch and can provide an output which provides a data to the microprocessor 1040 regarding the position of the mode selector switch. In Step 1142, the microprocessor 1040 reads the data regarding the position of the mode selector switch.

In an embodiment, the mode selector uses a Hall effect sensor. The Hall effect sensor can detect a magnetic field and produce an analog output (output voltage) signal proportional to the magnetic field. In an embodiment, the analog signal can be converted to a digital signal.

These values for an engaged bump mode are for example purposes, the disclosure is not limited to voltage, such as positive supply voltage, or magnetic flux density. These characteristics will be chosen and will depend upon the type of Hall effect sensor and magnets used. In an embodiment, surface flux density is measured at the center of a North and/or South face of a magnet.

In an embodiment, once the nailer is started and the microprocessor 1040 determines that the battery status and the solenoid data do not indicate a fault, then the power tool can be used by the operator to drive a fastener. Step 1120, Step 1130 and Step 1140 are not limited in the sequence of their execution. In different embodiments, the microprocessor 1040 can read data in a variety of sequences and in various orders, e.g Step 1140 can be executed prior to Step 1120.

Step 1144: Read Contact Switch Data. In Step 1144 a contact switch data can be read. In an embodiment, the microprocessor 1040 will read contact switch data that will indicate whether the contact switch has been tripped or is in a reset state. The tripping of the contact switch can indicate that the nose of the fastening tool is pressed against a workpiece.

Step 1146: Read Trigger 305 Switch Data. In Step 1146 a trigger 305 switch data can be read. In an embodiment, the microprocessor 1040 will read contact switch data that will indicate whether the trigger 305 switch has been tripped or is in a reset state. The tripping of the trigger 305 switch can indicate that the operator has depressed the trigger 305 mechanism and intends for the fastening tool to drive a fastener.

Step 1142, Step 1144 and Step 1146 are not limited in sequence. In different embodiments, the microprocessor 1040 can read data in a variety of sequences and in various orders.

Step 1160: Fault Handling. In Step 1160, fault handling can be executed. In FIG. 13, Step 1160 is shown as an example of fault handling which can be activated by Step 1130 or Step 1140. This illustration regarding Step 1160 is exemplary. Any data outside of specified values, unmet criteria, mechanical failure, lack of data, or undesired condition or data can cause the execution of Step 1160: Fault Handling. In additional example, if data of one or more of Step 1142, Step 1144, Step 1146 and Step 1170 is not within set criteria, then Step 1160: Fault Handling can be executed. Fault Handling should be broadly construed regarding the fastening tool, as well as a condition which could cause Fault Handling to be executed. Step 1160: Fault Handling, when executed, can result in one or more of: preventing the motor from turning; preventing a fastener from being driven; lock out of a driving mechanism; default to sequential mode; powering down of the fastening tool; locking of the contact switch, the trigger 305 switch or the trigger 305; locking of the solenoid or placing the fastening tool in a operator protection mode.

In an embodiment, the mode selector can default to "sequential mode" if any criteria is not within an approved specification. For example, if a magnet is not present, the logic of the microprocessor 1040 will recognize a fault and will default to sequential mode. In another example, if there is too much flux, the logic in the microprocessor 1040 will execute a default to sequential mode operation.

Step 1170: Decision Regarding Mode selector. In Step 1170, a decision can be made by the microprocessor regarding mode selection and the state of the mode selector switch 800. In an embodiment, the microprocessor 1040 will reach a decision regarding a mode of operation for the fastening tool. The decision regarding mode can result in a determination the conditions for operating in bump mode are met, or a determination the conditions for operation in sequential mode are met. Alternatively, a decision can be reached that a fault exists and that Step 1160: Fault Handling should be executed.

Step 1175: Bump Conditions Met. In Step 1175, the microprocessor will determine whether the conditions are met for operation of the tool in bump mode. If Step 1170 determines that the conditions for operating in bump mode are satisfied, Step 1175 can recognize that bump conditions are met and can initiate bump mode operating conditions for the fastening tool. In an embodiment, if bump mode conditions are met, the microprocessor 1040 will execute the machine readable code necessary to operate the fastening tool in bump mode and will operate the fastening tool in bump mode.

Step 1180: Run Fastening Device In Bump Mode. In Step 1180, the microprocessor can set the power tool to operate in bump mode. When bump mode is operational, the fastening device is run in bump mode and the Step 1200 can be executed which drives a fastener into a workpiece.

Step 1185: Sequential Conditions Met. In a Step 1175, the microprocessor will determine whether the conditions are met for operation of the tool in sequential mode. If the microprocessor 1040 determines that the conditions for sequential operation are affirmatively met, e.g. mode selector switch is set to sequential, then the microprocessor 1040 will execute the machine readable code necessary to operate the fastening tool in sequential mode and will operate the fastening tool in sequential mode.

In an embodiment, the operator protection mode of sequential operation can be used. In circumstances where the selector switch is set to bump mode, but the operational conditions of the fastening tool do not support bump mode operation, sequential mode operation can be executed. Alternatively, where a data read by the microprocessor 1040 does not satisfy the criteria for bump mode operation, the microprocessor 1040 can set the fastening tool operation to sequential mode directly, or can activate Step 1160: Fault Handling which can either cause the fastening tool to operate in sequential mode or place the fastening device in a operator protection condition in which it will not drive a fastener.

Step 1187: Bump Conditions Not Met. In Step 1187, the microprocessor can determine that bump conditions are not met. Under circumstances where the mode selector switch is set to bump mode, but a data read by the microprocessor 1040 indicates that bump conditions are not met, the microprocessor 1040 will determine that bump conditions are not met and can operate the fastening device in sequential mode.

Step 1190: Run Fastening Device In Sequential Mode. In Step 1190, the microprocessor can set the power tool to operate in sequential mode. If the microprocessor 1040 determines that conditions are met for operating the fastening device in sequential mode, whether by setting the mode selector switch to sequential mode, or by the conditions for bump mode not being satisfied, the microprocessor 1040 will execute the machine readable code necessary to operate the fastening tool in sequential mode and can operate the fastening tool in sequential mode.

Step 1200: Drive Fastener. In Step 1200, the microprocessor can reach a decision to drive a fastener, e.g. a nail. If conditions are met to operate the fastening device in bump mode and the conditions for driving a fastener in bump mode are met, then the fastening tool can drive a fastener in bump mode. Thus, a fastener is driven in bump mode.

If conditions are met to operate the fastening device in sequential mode and the conditions for driving a fastener in sequential mode are met, then the fastening tool can drive a fastener in sequential mode. Thus, a fastener is driven in sequential mode.

This disclosure is to be broadly construed to encompass means for controlling forces experienced by a contact trip actuator. Additionally, this disclosure encompasses means for actuating the driving of a nail as set forth herein, as well as also without the use of a contact trip actuator. Such means include a broad variety of mechanisms including an actuation element which connects an activation rod or equivalent to a tactile switch or equivalent. This disclosure also encompasses a broad variety of means for absorbing shock in an actuation mechanism for driving a nail.

This disclosure encompasses the methods for controlling the forces experienced by a tactile switch or equivalent, as well as methods to absorb shock within an actuation mechanism. Additionally, This disclosure encompasses the methods for actuating and controlling the actuation of a driving or firing of a fastener by a fastening tool The scope of this disclosure is to be broadly construed. It is intended that this disclosure includes equivalents, means, systems and methods to achieve the devices, activities, mechanical actions, mechanical elements, mechanisms and devices disclosed herein. Additionally, this disclosure regards a fastening tool and its many aspects, features and elements. Such a tool can be dynamic in its use and operation, this disclosure is intended to encompass the equivalents, means, systems and methods of the use of the tool and its many aspects consistent with the description and spirit of the operations and functions disclosed herein. The claims of this application are likewise to be broadly construed.

The description of the inventions herein in their many embodiments is merely exemplary in nature and, thus, variations that do not depart from the gist of the invention are intended to be within the scope of the invention. Such variations are not to be regarded as a departure from the spirit and scope of the invention.

We claim:

1. A power tool, comprising:
   a mode selector switch having a knob that when moved from a first position to a second position affects an output signal of a linear Hall effect sensor to a microprocessor configured to change an operational mode of the power tool from a first operational mode to a second operational mode different from the first operational mode when the output signal changes;
   the mode selector switch capable of causing a first magnet and a second magnet to move a distance of a throw;
   the first magnet and the second magnet when moved the distance of the throw effect a change from the first operational mode to the second operational mode;
   the first magnet having at least a first magnetic field providing a first magnetic source to the mode selector switch;
   the second magnet having at least a second magnetic field providing a second magnetic source to the mode selector switch;

the linear Hall effect sensor affixed to a circuit board and configured to produce the output signal that changes when the strength of at least one of the first magnetic field and the second magnetic field experienced by the linear Hall effect sensor changes;

the linear Hall effect sensor having a facing surface and the magnet having a face, the facing surface configured at a sensing distance from the face of the first magnet.

2. The power tool according to claim 1, wherein the power tool is a nailer.

3. The power tool according to claim 2, wherein the operational mode is a sequential mode.

4. The power tool according to claim 2, wherein the operational mode is a nonsequential mode.

5. The power tool according to claim 2, wherein the operational mode is a bump mode.

6. The power tool according to claim 2, wherein the operational mode is a bump mode when the output of the linear Hall effect sensor is in a range of from 5 mT at 1.7V to 55 mT at 2.8 V.

7. The power tool according to claim 2, wherein the operational mode is a sequential mode when the output of the linear Hall effect sensor is in a range of negative 60 mT at 0.0 V to less than 5 mT at less than 1.7 V, and when the output of the linear Hall effect sensor is greater than 55 mT at greater than 2.7 V.

8. The power tool according to claim 1, wherein the source of at least the first magnetic field is a magnet and a distance between a portion of the magnet and a portion of the linear Hall effect sensor is a value in a range of 0.1 mm to 6.00 mm.

9. The power tool according to claim 1, wherein the operational mode is switched to sequential mode when a fault condition is detected regarding the output signal.

10. The power tool according to claim 1, wherein the throw is equal to or greater than the sensing distance.

11. The power tool according to claim 1, wherein the throw is equal to or less than the sensing distance.

12. The power tool according to claim 1, wherein a zero flux density experienced by the linear Hall effect sensor causes an output of the linear Hall effect sensor resulting from the zero flux density to be sent to the microprocessor that changes the mode of operation of the power tool to a sequential mode of operation of the power tool in response to such output.

13. The power tool according to claim 1, wherein the microprocessor is configured such that when the linear Hall effect sensor experiences a one or more magnetic fields not originating from a magnet of the mode selector switch the resulting output from the linear Hall effect sensor experiencing the one or more magnetic fields not originating from a magnet of the mode selector switch does not cause a change in operational mode of the tool.

14. The power tool according to claim 1, wherein the microprocessor is configured such that a bump mode occurs only when the linear Hall effect sensor transmits an output in a sensor range indicating the linear Hall effect sensor is experiencing a flux having a value that is at least 10% of the sensor range from a high sensor saturation point and at least 10% of the sensor range from a low sensor saturation point and at least 10% of the sensor range from a flux value of zero.

15. A power tool, comprising:
a switching means for switching the power tool from a first operational mode to a second operational mode different from the first operational mode;

the switching means having a first source of at least a first magnetic field;

the switching means having a second source of at least a second magnetic field;

the switching means adapted to move at least the first source from a first position to a second position;

a linear Hall effect sensor sensing the strength of at least one of the first magnetic field and the second magnetic field;

the linear Hall effect sensor having a fixed position in relation to a circuit board;

the linear Hall effect sensor having a sensing distance of 3 mm or greater between the linear Hall effect sensor and the first source;

the linear Hall effect sensor adapted to produce an output signal which is an analog output signal and which changes when the strength of at least one of the first magnetic field and the second magnetic field changes; and a data processing means that processes the output signal and changes the first operational mode to the second operational mode when the output signal changes.

16. The power tool according to claim 15, wherein the power tool is a nailer.

17. The power tool according to claim 15, wherein the switching means comprises a means for changing the relative distance between the source of at least a first magnetic field and the linear Hall effect sensor.

18. The power tool according to claim 15, wherein the switching means comprises a means for changing the relative distance between the source of at least a first magnetic field and the linear Hall effect sensor which is a member that can be moved and that has a magnet.

19. The power tool according to claim 15, wherein the linear Hall effect sensor is a magnetoresistor.

20. The power tool according to claim 15, wherein the data processing means is a microprocessor.

21. A method of controlling a power tool, comprising the steps of:
providing a switch adapted to change an operational mode of the power tool when a magnetic member is moved from a first position to a second position;

providing the magnetic member which has at least a first magnetic field; the magnetic member having a face;

providing a means to move the magnetic member from the first position to the second position;

providing a linear Hall effect sensor which has a magnetoresistor at a fixed location in the power tool detecting the first magnetic field and producing a first output of the magnetoresistor to a microprocessor; the linear Hall effect sensor having a facing surface;

the facing surface configured at a sensing distance which is 3 mm or greater from the face of the magnetic member;

exposing the magnetoresistor to a first magnetic flux of the first magnetic field;

moving the magnetic member a distance of a throw from the first position to the second position and exposing the magnetoresistor to a second magnetic flux different from the first magnetic flux; the exposing the magnetoresistor to a second magnetic flux producing a second output of the magnetoresistor to the microprocessor;

computationally identifying the change from the first output of the magnetoresistor to the second output of the magnetoresistor by the microprocessor; and processing machine readable instructions by the microprocessor to change the operational mode of the power tool from a first operational mode to a second operational mode different from the first operational mode based upon identifying the change from the first output of the magnetoresistor to the second output of the magnetoresistor.

22. The method of controlling a power tool according to claim 21, further comprising the step of changing to the second operational mode, which is a sequential mode.

23. The method of controlling a power tool according to claim 21, wherein the second operational mode is a bump mode.

24. A power tool, comprising:

a mode selector switch having a knob that when moved from a first position to a second position affects the output of a linear Hall effect sensor to a microprocessor configure to change an operational mode of the power tool from a first operational mode to a second operational mode different from the first operational mode when the output signal changes;

a first magnet that is moved a distance of a throw from the first position to the second position to effect a change from the first operational mode to the second operational mode;

the first magnet having at least a first magnetic field providing a magnetic source to the mode selector switch;

the linear Hall effect sensor affixed to a circuit board and configured to produce an output signal that changes when the strength of the first magnetic field experienced by the linear Hall effect sensor changes;

the linear Hall effect sensor having a facing surface and the magnet having a face, the facing surface configured at a sensing distance of 3 mm or greater from the face of the first magnet.

\* \* \* \* \*